US008739268B2

(12) United States Patent
Komatsu

(10) Patent No.: US 8,739,268 B2
(45) Date of Patent: *May 27, 2014

(54) SECURITY GATEWAY SYSTEM, METHOD THEREOF, AND PROGRAM

(75) Inventor: Satoshi Komatsu, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1528 days.

This patent is subject to a terminal disclaimer.

(21) Appl. No.: 11/911,255

(22) PCT Filed: Apr. 11, 2006

(86) PCT No.: PCT/JP2006/307622
§ 371 (c)(1),
(2), (4) Date: Mar. 21, 2008

(87) PCT Pub. No.: WO2006/109789
PCT Pub. Date: Oct. 19, 2006

(65) Prior Publication Data
US 2009/0064308 A1 Mar. 5, 2009

(30) Foreign Application Priority Data
Apr. 12, 2005 (JP) ................. 2005-115024

(51) Int. Cl.
G06F 17/00 (2006.01)
H04L 29/06 (2006.01)
G06F 21/60 (2013.01)
G06F 21/82 (2013.01)

(52) U.S. Cl.
CPC .......... H04L 63/0209 (2013.01); G06F 21/606 (2013.01); G06F 21/82 (2013.01); H04L 63/029 (2013.01)
USPC ....................................................... 726/12

(58) Field of Classification Search
CPC ......... G06F 21/60; G06F 21/70; G06F 21/82; H04L 63/02; H04L 63/0209; H04L 63/0218; H04L 63/029; H04L 29/06551; H04L 29/06557; H04L 29/06564; H04L 29/06571
USPC ................................................. 726/11–12, 14
See application file for complete search history.

(56) References Cited

U.S. PATENT DOCUMENTS 6,098,172 A 8/2000 Coss et al.
6,212,633 B1 4/2001 Levy et al.
(Continued)

FOREIGN PATENT DOCUMENTS

JP 2000-172597 A 6/2000
JP 2002-215478 A 8/2002
(Continued)

OTHER PUBLICATIONS

S. Komatsu, U.S. PTO Office Action, U.S. Appl. No. 12/597,077, dated Apr. 27, 2012, 9 pages.
(Continued)

Primary Examiner — Linglan Edwards
Assistant Examiner — Kevin Bechtel
(74) Attorney, Agent, or Firm — Foley & Lardner LLP

(57) ABSTRACT

A non-secure network gateway 11 and a secure network gateway 12 are realized by mutually independent computers, and are connected, by standard protocol communication portions 20 and 25, to a non-secure network 1 and a secure network 2 using a standard protocol the standardized specifications of which have been published. Data exchange between non-standard protocol communication portions 22 and 23 of the sub-gateways 11 and 12 is performed using a nonstandard protocol the specifications of which have not been published, and data exchange between the nonstandard side and the standard side is performed only in the application layer. Protocol conversion portions 21 and 24 refers to relay permission settings tables 30 and 31 to confirm relay permission for communication data, and perform protocol conversion only when relaying is permitted. Even in the event that illicit communication data from one network has penetrated into a gateway, penetration of the communication data into the other network can be prevented.

11 Claims, 19 Drawing Sheets

(56) References Cited

U.S. PATENT DOCUMENTS

| | | | |
|---|---|---|---|
| 6,463,465 B1 * | 10/2002 | Nieuwejaar | 709/217 |
| 7,949,871 B2 | 5/2011 | Randle et al. | |
| 7,966,418 B2 * | 6/2011 | Shedrinsky | 709/237 |
| 8,079,059 B1 | 12/2011 | Lee | |
| 8,108,679 B2 | 1/2012 | Wiseman | |
| 2002/0126678 A1 * | 9/2002 | Kelly et al. | 370/401 |
| 2003/0058884 A1 * | 3/2003 | Kallner et al. | 370/465 |
| 2006/0075478 A1 * | 4/2006 | Hyndman et al. | 726/11 |
| 2006/0248205 A1 | 11/2006 | Randle et al. | |
| 2007/0255852 A1 | 11/2007 | McBride et al. | |
| 2010/0064352 A1 * | 3/2010 | Holden et al. | 726/4 |
| 2010/0241748 A1 | 9/2010 | Ansari et al. | |

FOREIGN PATENT DOCUMENTS

| | | |
|---|---|---|
| JP | 2003-110628 A | 4/2003 |
| JP | 2004-228616 A | 8/2004 |
| JP | 2004-274493 A | 9/2004 |
| JP | 2006-99590 A | 4/2006 |
| WO | WO 96/18253 A1 | 6/1996 |
| WO | WO 01/02963 A1 | 1/2001 |

OTHER PUBLICATIONS

S. Komatsu, U.S. PTO Notice of Allowance, U.S. Appl. No. 12/597,077, dated Aug. 7, 2012, 9 pages.

T. Yamamoto et al., "Oki Technical View Dai 200 Go", vol. 71, No. 4, Oct. 1, 2004, pp. 58-61.

S. Komatsu, U.S. PTO Office Action, U.S. Appl. No. 12/597,077, dated Dec. 7, 2011, 9 pages.

* cited by examiner

FIG. 8

|   | TRANSMISSION SOURCE PERMISSION INFORMATION | | | DESTINATION PERMISSION INFORMATION | |
|---|---|---|---|---|---|
|   | PROTOCOL NO. | PORT NO. | TRANSMISSION SOURCE ADDRESS | PORT NO. | DESTINATION ADDRESS |
| 1 | 1 | 2 | AAA, BBB, CCC, DDD | 2 | EEE, FFF, GGG, HHH |
| 2 | 24 | * | *,*,*,* | * | *,*,*,* |
| 3 | 53 | * | *,*,*,* | * | *,*,*,* |
| 4 | ** | * | *,*,*,* | * | *,*,*,* |
| 5 | ** | * | *,*,*,* | * | *,*,*,* |
| ⋮ | ⋮ | ⋮ | ⋮ | ⋮ | ⋮ |

FIG. 9

|   | TRANSMISSION SOURCE PERMISSION INFORMATION | | | DESTINATION PERMISSION INFORMATION | |
|---|---|---|---|---|---|
|   | PROTOCOL NO. | PORT NO. | TRANSMISSION SOURCE ADDRESS | PORT NO. | DESTINATION ADDRESS |
| 1 | 1 | 2 | EEE, FFF, GGG, HHH | 2 | WWW, XXX, YYY, ZZZ |
| 2 | 24 | * | *,*,*,* | * | *,*,*,* |
| 3 | 53 | * | *,*,*,* | * | *,*,*,* |
| 4 | ** | * | *,*,*,* | * | *,*,*,* |
| 5 | ** | * | *,*,*,* | * | *,*,*,* |
| ⋮ | ⋮ | ⋮ | ⋮ | ⋮ | ⋮ |

FIG. 16

| | TRANSMISSION SOURCE PERMISSION INFORMATION | | | DESTINATION PERMISSION INFORMATION | | INSPECTION INFORMATION NO. |
|---|---|---|---|---|---|---|
| | PROTOCOL NO. | PORT NO. | TRANSMISSION SOURCE ADDRESS | PORT NO. | DESTINATION ADDRESS | |
| 1 | 1 | 2 | AAA, BBB, CCC, DDD | 2 | EEE, FFF, GGG, HHH | 1 |
| 2 | 24 | * | *.*.*.* | * | *.*.*.* | * |
| 3 | 53 | * | *.*.*.* | * | *.*.*.* | * |
| 4 | ** | * | *.*.*.* | * | *.*.*.* | * |
| 5 | ** | * | *.*.*.* | * | *.*.*.* | * |
| ⋮ | ⋮ | ⋮ | ⋮ | ⋮ | ⋮ | ⋮ |

FIG. 17

| INSPECTION INFORMATION NO. | CONDITION | JUDGMENT CONDITION |
|---|---|---|
| 1 | AND | 0x0012, "GET". |
| 1 | OR | |
| 1 | NAND | |
| 1 | NOR | |
| 1 | USR | CONDITION DETERMINATION EMBEDDED PROGRAM |
| 3 | ** | |
| 4 | ** | |
| 5 | ** | |
| ⋮ | ⋮ | ⋮ | ed and can be obtained by anyone. Based on hardware and
SECURITY GATEWAY SYSTEM, METHOD THEREOF, AND PROGRAM

TECHNICAL FIELD

This invention relates to a security gateway system, which connects a plurality of networks each using a standard protocol the standardized specifications of which have been published, and a method and program for such a system.

BACKGROUND ART

In the field of network communication technology, by performing communications using the Internet protocol (IP) which is a de facto standard, services can be provided to the entire Internet from independent networks and specific groups using manufacturer-specific communication protocols, enabling provision of services to people around the world.

This Internet protocol (IP) is an example of a protocol used in open systems interconnection; the specifications are published and can be obtained by anyone. Based on hardware and software for communication using this published specification, standardized Internet services are provided, and these also can be obtained and used by anyone.

When such circumstances, in which standardized means can be obtained by anyone to receive services, are applied to corporate activities and similar, there are dangers regarding consequences for confidentiality of communications and for corporate computer system security, and so numerous security methods to avoid such dangers have been devised and realized.

In general-use security equipment, security methods are adopted according to hierarchical communication layers used to achieve open systems interconnection.

In the Internet protocol (IP), communication is performed through the transmission and reception of data (packets) to which are appended original IP addresses assigned to communicating computers, protocol numbers, communication ports, and other information. In order to ensure security, a method is employed in which communication from computers which have not been permitted is blocked (packet filtering).

In this packet filtering, permitted IP addresses, protocol numbers, communication ports, and similar are set in devices (routers) which connect networks. A router then maintains security by deciding whether to pass data, based on permission setting information. However, packet filtering performed in the data link layer and the network layer, which are positioned at lower levels in open systems interconnections, have the drawback of a low level of security, due to the inability to set complicated conditions and execute control.

On the other hand, a firewall is a device which affords a higher level of security than do routers which interconnect networks. A firewall ensures security at a higher level than in open systems interconnections, in order to compensate for the drawbacks to security using IP filtering.

For example, one such firewall is a transport-level proxy, used to maintain security in the transport layer; as methods used in higher layers, there are application-level proxies which maintain security in the application layer and similar. Such application proxies are also called application gateways, and provide firewall functions which are the most intelligent and provide the highest level of security among proxy functions.

Patent Document 1: Japanese Patent Laid-open No. 2000-172597

Non-Patent Document 1: Intra & Internet Security (Ohm Co.) by Takahiro Sugimoto, ISBN4-274-06162-0

However, a firewall is a device constituted of a computer and software, and so is defenseless against illicit communication data such as spoofed packets, and moreover is defenseless against software incompatibilities and against security threats which attempt to exploit newly discovered security holes. In particular, when a computer system is being protected solely by a firewall, if the firewall is breached the computer system is reduced to a completely defenseless state. For this reason, mechanisms for shutting out unknown threats remain indispensable to maintain the security of corporate infrastructures and other control systems of a highly public nature.

Moreover, constant maintenance is essential for firewalls and other security equipment in order to provide protective measures against newly discovered security holes and other threats. In general, software updates provided by security equipment manufacturers must be carried out to perform maintenance; the updates are themselves performed over the Internet, which is a public network. Thus a contradiction arises in which, despite the fact that a device is within a secure network, the device must be connected to the network which is lacking in security.

In Patent Document 1, a communication method is disclosed in which TCP/IP communication is performed using a LAN in a communication interface with an external network, with serial communication to an internal network performed via a protocol conversion server function. In Patent Document 1, security is maintained through various filtering in the relay process; however, should illicit communication data once penetrate the device, because a standardized protocol is being used, the devices which exist beyond the interface, and the security of which must be maintained, can easily be accessed, so that there remain concerns with respect to security and reliability.

This invention was devised in order to resolve the above-described problems, and has as an object the provision of a security gateway system, and a method and program for such a system, in a gateway connecting a plurality of networks utilizing a standard protocol which has been standardized and the specifications of which have been published, which affords a high degree of security and reliability, and which, even in the event that illicit communication data has penetrated into the gateway from one network, prevents penetration of this communication data into other networks.

DISCLOSURE OF THE INVENTION

In order to attain the above object, in this invention two sub-gateways realized by mutually independent computers are respectively connected to two networks, and data exchange between the sub-gateways is performed by means of a nonstandard protocol; in addition, within a sub-gateway, data exchange between the nonstandard side and the standard side is performed only on the application layer. By this means, when illicit communication data penetrates into one sub-gateway from one network, penetration of the communication data into the other sub-gateway can be prevented.

A security gateway system of this invention is a security gateway system connecting a plurality of networks each of which uses a standard protocol the standardized specifications of which have been published, having two sub-gateways, realized by mutually independent computers, connected to two networks as the objects for connection respectively, and is characterized in that these sub-gateways are configured as explained below.

Each sub-gateway has a standard protocol communication portion, which performs communication with the network to which the same sub-gateway is connected using the standard protocol; a nonstandard protocol communication portion, which performs communication with the other sub-gateway using a nonstandard protocol, the specifications of which have not been published; a protocol conversion portion, which performs protocol conversion of communication data between the standard protocol and the nonstandard protocol; and a relay permission setting information storage portion, which holds relay permission setting information used to confirm relay permission for communication data.

The two sub-gateways have shared memory which can be accessed by the respective nonstandard protocol communication portion of each of the sub-gateways, and are configured such that data can be exchanged between the nonstandard protocol communication portions by accessing the shared memory using the nonstandard protocol, without direct communication between the nonstandard protocol communication portions. The nonstandard protocol communication portion of each sub-gateway is an original communication portion which has an implemented application layer which is a seventh layer in the Open Systems Interconnection (OSI) model, and which has unpublished and original communication layers implemented for the range corresponding to first through sixth layers, so that data exchange between the nonstandard protocol communication portion and the standard protocol communication portion within the same sub-gateway is performed only in the application layer which is the seventh layer, and data exchange is not possible in the range corresponding to the first through sixth layers. The protocol conversion portion of each sub-gateway refers to the relay permission setting information when performing protocol conversion of communication data to confirm relay permission for the communication data, and when relay has been permitted, performs protocol conversion of the communication data.

Further, a security gateway method and security gateway program of this invention incorporate the characteristics of the above system in the form of a method and in the form of a program respectively.

By means of the above-described invention, two sub-gateways, realized through mutually independent computers, are completely separated physically, and communication between the sub-gateways is performed by means of a nonstandard protocol the specifications of which have not been published. Hence in the event that illicit communication data from a network has penetrated into one of the sub-gateways, at the stage of protocol conversion of the communication data, the relay permission setting information is referred to and the fact that the communication data is illicit can be easily confirmed, and the communication data discarded or other appropriate processing performed, so that penetration of illicit communication data into the other sub-gateway can be prevented. In particular, data exchange between the sub-gateways is performed through accessing of shared memory, without performing direct communication, so that no communication function connection relation at all exists between the sub-gateways, and consequently the networks are completely separated, so that in terms of security, data can be exchanged safely between the networks. Hence secure networks can be protected from security threats existing within non-secure networks.

Further, data exchange between the nonstandard-side and the standard-side protocol communication portions within each sub-gateway is performed only in the application layer, so that the nonstandard side and standard side are separated in layers below the protocol communication portions. Hence even in cases when illicit communication data from a network has penetrated via a security hole in the standard protocol communication portion in one sub-gateway, penetration to the nonstandard protocol communication portion can be prevented, and so penetration of illicit communication data to the other network can be prevented.

As explained above, communication between sub-gateways is performed using a nonstandard protocol the specifications of which have not been published, and moreover a complete network separation design is employed in which data exchange is performed by accessing shared memory, rather than by direct communication. Consequently even in cases in which illicit communication data which has penetrated causes overwriting of relay permission setting information in one of the sub-gateways, the illicit communication data cannot penetrate into the other sub-gateway to overwrite relay permission setting information. Hence in such cases an anomaly can be detected based on the mismatch of relay permission setting information in the other sub-gateway, and the illicit communication data can be discarded or otherwise processed, so that penetration of illicit communication data into the other network can be reliably prevented.

Further, by performing data exchange between the two sub-gateways via accessing of shared memory using a nonstandard protocol as described above, security and reliability can be improved, and in addition standard protocols can be used to communicate with the networks to which each of the gateways is connected. As a result, legitimate users can easily use servers protected by a system of this invention, employing means similar to those used to connect to networks in general without the need for conversion between specialized protocols or languages or for other special measures, so that there are no drawbacks for user-friendliness. And, communication functions between the sub-gateways utilize a specialized and original transport layer API or similar, and so can easily be realized.

By means of this invention, a security gateway system, as well as a method and program for a security gateway system, can be provided which, even in the event of penetration of illicit communication data from one network into the gateway, can prevent penetration of the communication data into another network, and which affords a high level of security and reliability.

BRIEF DESCRIPTION OF THE DRAWINGS

FIG. 8 shows an example of the configuration of data stored in the relay permission settings table of a non-secure network gateway in the first embodiment;

FIG. 9 shows an example of the configuration of data stored in the relay permission settings table of a secure network gateway in the first embodiment;

FIG. 16 shows an example of the configuration of data in a relay permission settings table with inspection information numbers of the third embodiment;

FIG. 17 shows an example of the configuration of data in an inspection information table of the third embodiment;

BEST MODE FOR CARRYING OUT THE INVENTION

Figure 1:
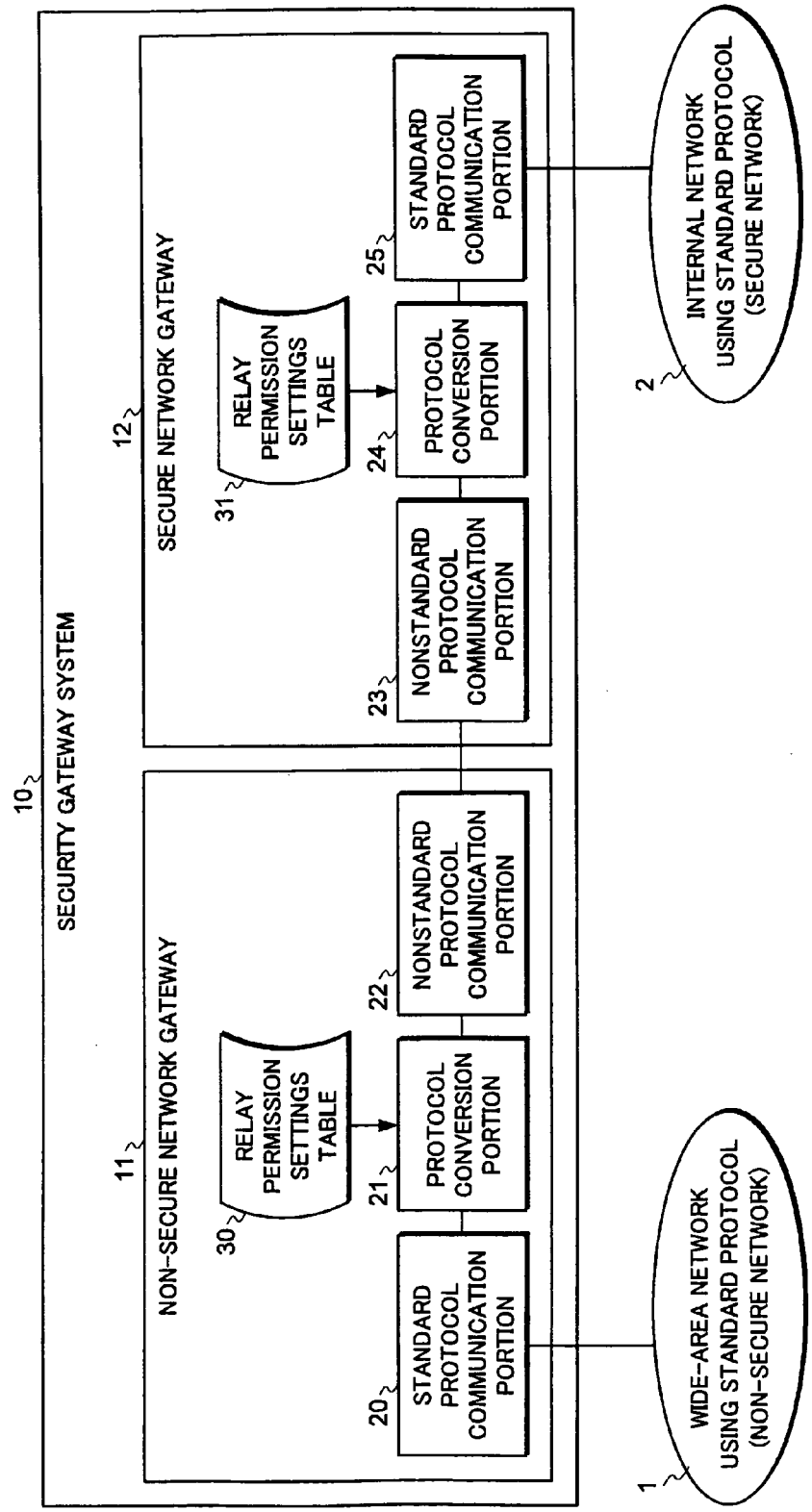
FIG. 1 shows the configuration of the security gateway system of a first embodiment of the invention.

Below, embodiments of the invention are explained referring to the drawings. However, the embodiments described here in no way limit the invention, and are merely illustrations of modes of realization of the invention. This invention is typically realized by controlling computers using software. The software in this case effects the functions and advantageous results of each of the computers in the invention by physically utilizing the computer hardware; and technology of the prior art is applied as appropriate to portions to which technology of the prior art can be applied. The types and configurations of hardware and software employed to realize this invention, the scope of processing by software, and other parameters may be freely modified; for example, a program used to realize this invention is one mode of realization of the invention.

Explanation of Terms

Below, a number of important terms used in this Specification are explained in order.

"Secure network": A network which provides services within a company or to another specific group, and the security of which must be maintained.

"Non-secure network": A network, of which the Internet is representative, which is a wide-area network or public network, which is connected to and used by numerous unspecified people.

"Standard protocol": A communication protocol based on standards instituted by the International Standards Organization (ISO), Institute of Electrical and Electronics Engineers (IEEE), American National Standards Institute (ANSI), International Telecommunication Union (ITU), International Electrotechnical Commission (IEC), Japanese Industrial Standards (JIS), or another standards organization, the specifications of which have been published and can be obtained by anyone.

"Nonstandard protocol": A communication protocol which has not been instituted by a standards organization, and the specifications of which have not been published.

"Non-secure network gateway": A sub-gateway which executes communication with a non-secure network using a standard protocol, which performs communication with its own network using a nonstandard protocol, and which performs bidirectional data relaying between the non-secure network and its own network.

"Secure network gateway": A sub-gateway which executes communication with a secure network using a standard protocol, performs communication with its own network using a nonstandard protocol, and which performs bidirectional data relaying between the secure network and its own network.

"Relay permission settings table": A table which stores settings data to use in confirming whether relaying is permitted for communication data. This table is possessed by both of a non-secure network gateway and a secure network gateway, respectively.

"Protocol conversion": Conversion between a standard protocol and a nonstandard protocol.

First Embodiment

System Configuration

FIG. 1 shows the configuration of the security gateway system (hereafter abbreviated as appropriate to "system") of a first embodiment to which the invention is applied.

As shown in FIG. 1, the security gateway system 10 of this embodiment is constituted of two sub-gateways, which are a non-secure network gateway 11, connected to a wide-area network (non-secure network) 1 using a standard protocol, and a secure network gateway 12, connected to an internal network (secure network) 2 using a standard protocol. Here, the non-secure network gateway 11 and the secure network gateway 12 are realized by means of mutually independent computers.

The non-secure network gateway 11 is constituted of a standard protocol communication portion 20, protocol conversion portion 21, nonstandard protocol communication portion 22, and relay permission settings table 30. The secure network gateway 12 is constituted of a nonstandard protocol communication portion 23, protocol conversion portion 24, standard protocol communication portion 25, and relay permission settings table 31.

Each of the above portions is explained in detail below.

The wide-area network 1 using a standard protocol is a network which uses a communication protocol which has published, standardized specifications, and in general is a network, such as the Internet, which can be connected to and used by numerous unspecified people. Consequently there is the possibility that malicious participants may connect to and use the network as well, and the network has a low level of security. As explained above, in this Specification, such a network with low security is called a "non-secure network".

The internal network 2 using a standard protocol is a network the purpose of which is to provide services to a specific group, such as within a company, and is a network for which security must be maintained, and which requires protection against intrusions and attacks from the wide-area network 1 using a standard protocol. As explained above, in this Specification, such a network for which security is required to be maintained is called a "secure network".

The security gateway system 10 of this embodiment is a system which can connect the above-described non-secure network 1 with low security to a secure network 2 for which security is required to be maintained, while ensuring security. In this case, communication performed to connect to the non-secure network 1, and communication performed to connect to the secure network 2, are both performed using a standard protocol the specifications of which have been published. On the other hand, communication between the two sub-gateways in the security gateway system 10, that is, communication between the non-secure network gateway 11 and the secure network gateway 12, is performed using a nonstandard protocol the specifications of which have not been published.

The portions 20 through 25 of the non-secure network gateway 11 and the secure network gateway 12 have the functions described below, in order to realize communication using a standard protocol with the networks 1 and 2, as well as communication using a nonstandard protocol between the sub-gateways 11 and 12, as described above.

In the non-secure network gateway 11, the standard protocol communication portion 20 has functions for communication with the non-secure network 1 connected to the non-secure network gateway 11 using the standard protocol, and the nonstandard protocol communication portion 22 has functions for communication with the secure network gateway 12 using the nonstandard protocol the specifications of which have not been published.

In the secure network gateway 12, the standard protocol communication portion 25 has functions for communication with the secure network 2 connected to the secure network gateway 12 using the standard protocol, and the nonstandard protocol communication portion 23 has functions for communication with the non-secure network gateway 11 using the nonstandard protocol the specifications of which have not been published.

In the non-secure network gateway 11 and second network gateway 12, each of the protocol conversion portions 21 and 24 has functions for data conversion between the standard protocol and the nonstandard protocol. Each of the protocol conversion portions 21, 24 refers to a relay permission settings table 30, 31 to confirm whether relaying of the communication data is permitted when performing protocol conversion of the communication data, and performs protocol conversion of the communication data only when relaying has been permitted.

Each of the relay permission settings tables 30, 31 has functions for storing relay permission setting information, to be used in confirming whether relaying is permitted for communication data, and is equivalent to the relay permission setting information storage portion of the invention. As relay permission setting information, transmission source permission information including transmission source addresses indicating permitted transmission sources, and destination permission information including destination addresses indicating permitted destinations, are set in advance and stored.

Figure 2:
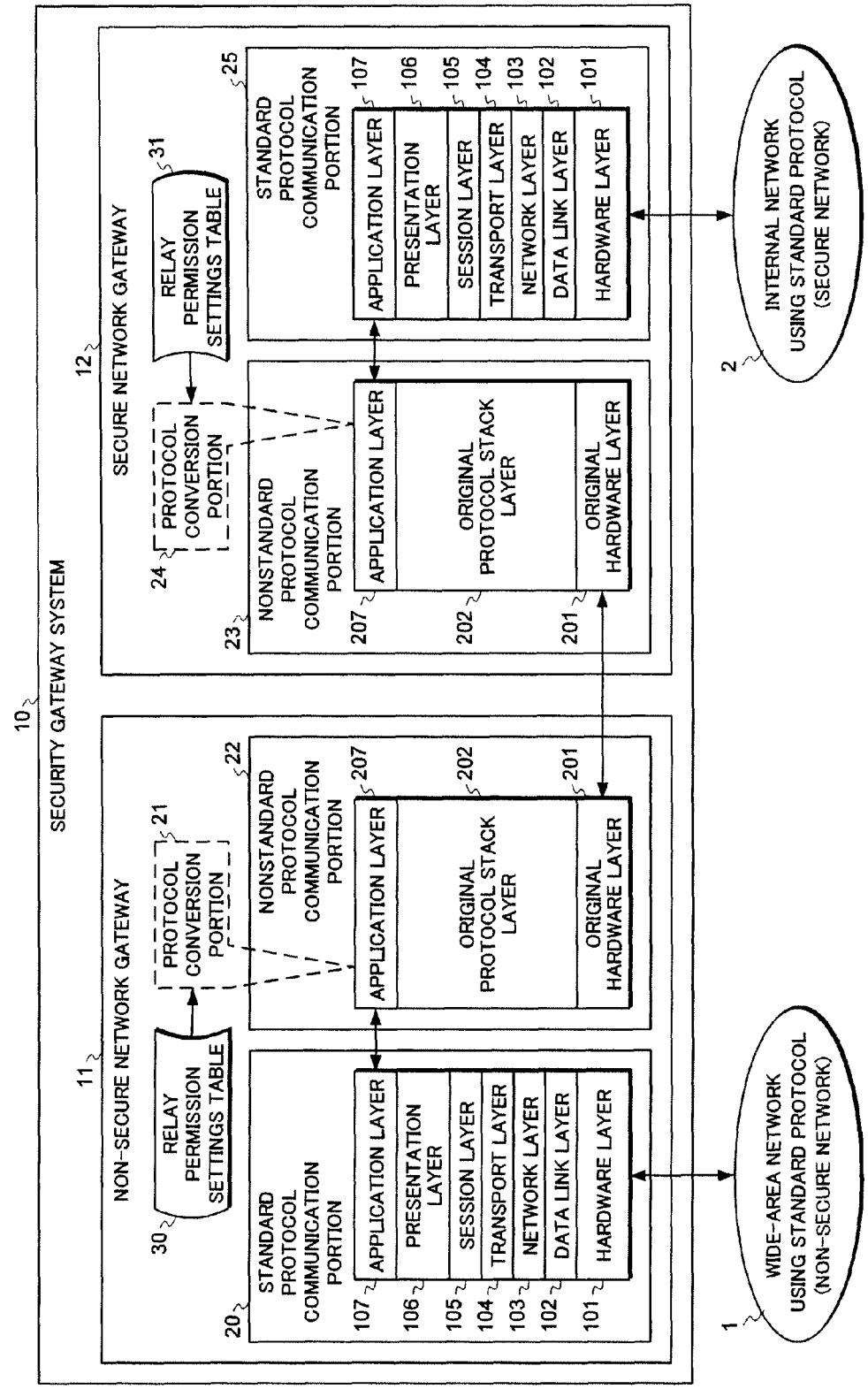
FIG. 2 is a conceptual diagram, using the concept of the Open Systems Interconnection (OSI) model of communication layers to show the configuration of the standard protocol communication portions and nonstandard protocol communication portions in the first embodiment.

FIG. 2 is a conceptual diagram, using the concept of the Open Systems Interconnection (OSI) model of communication layers to show the configuration of the standard protocol communication portions 20, 25 and nonstandard protocol communication portions 22, 23 in the non-secure network gateway 11 and secure network gateway 12 of the security gateway system 10 shown in FIG. 1.

As shown in FIG. 2, the standard protocol communication portions 20, 25 have implemented communication layers which are the first through seventh communication layers of the Open Systems Interconnection (OSI) model, that is, a hardware layer 101, data link layer 102, network layer 103, transport layer 104, session layer 105, presentation layer 106, and application layer 107, in order to perform communication using a standard protocol.

On the other hand, the nonstandard protocol communication portions 22, 23 have an original configuration, having an implemented application layer 207, which is the seventh layer in the Open Systems Interconnection (OSI) model, and for the range corresponding to the first through sixth layers, an original hardware layer 201 and original protocol stack layer 202, as unpublished and original communication layers. The nonstandard protocol communication portions 22, 23 thus have an unpublished and original configuration for the range from the first layer to the sixth layer, and so data exchange with the standard protocol communication portions 20, 25 is performed only in the seventh or application layer 207, and data exchange is not possible over the range corresponding to the first through sixth layers. Further, the nonstandard protocol communication portions 22, 23 are not equipped with applications which perform the various standard services (ftp, telnet, and similar) with which standard protocol communication portions 20, 25 are typically equipped.

Further, as shown in FIG. 2, the protocol conversion portions 21, 24 can be realized through the application layers 207 of the nonstandard protocol communication portions 22, 23, but may also be configured independently and separately from the nonstandard protocol communication portions 22, 23.

System Operation

Figure 3:
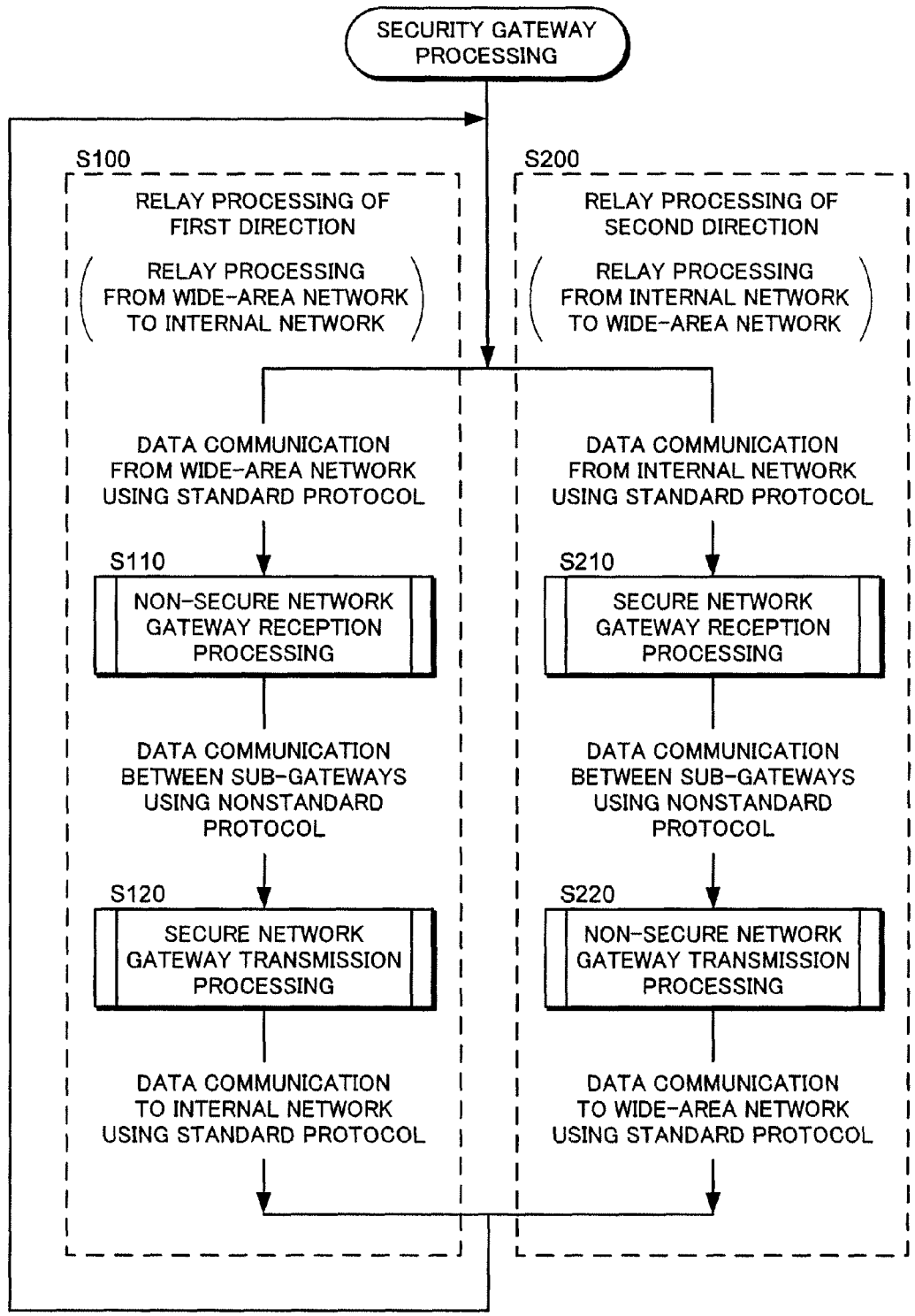
FIG. 3 is a flowchart showing in summary the operation of the security gateway system of the first embodiment.

FIG. 3 is a flowchart showing in summary the operation of the security gateway system 10 of the above-described first embodiment.

As shown in FIG. 3, the security gateway system 10 of this embodiment performs relay processing in two directions, which are the relay processing of a first direction (S100) and the relay processing of a second direction (S200), as security gateway processing.

Here, the relay processing of the first direction (S100) is relay processing from the wide-area network (non-secure network) 1 using a standard protocol, to the internal network (secure network) 2 using a nonstandard protocol. And, the relay processing of the second direction (S200) is relay processing from the internal network (secure network) 2 using the nonstandard protocol, to the wide-area network (non-secure network) 1 using the standard protocol.

In the relay processing of the first direction (S100), non-secure network gateway reception processing (S110) from the non-secure network gateway 11 is first performed, according to data communication from the wide-area network 1 using the standard protocol. That is, communication data is received using the standard protocol by the standard protocol communication portion 20, conversion into the nonstandard protocol is performed by the protocol conversion portion 21 after referring to the relay permission settings table 30, and processing for transmission to the secure network gateway 12 is performed by the nonstandard protocol communication portion 22. As a result, data communication using the nonstandard protocol from the non-secure network gateway 11 to the secure network gateway 12 is performed.

In this way, secure network gateway transmission processing (S120) is performed by the secure network gateway 12, according to data communication from the non-secure network gateway 11 using the nonstandard protocol. That is, the nonstandard protocol communication data is received by the nonstandard protocol communication portion 23, and after referring to the relay permission settings table 31, the protocol conversion portion 24 converts the data into the standard protocol; the standard protocol communication portion 25 then performs processing for transmission to the internal network 2 using the standard protocol. As a result, data communication is performed from the secure network gateway 12 to the internal network 2 using the standard protocol.

In the relay processing of the second direction (S200), secure network gateway reception processing (S210) is first performed by the secure network gateway 12, according to data communication from the internal network 2 using the standard protocol. That is, communication data is received by the standard protocol communication portion 25 using the standard protocol, and after referring to the relay permission settings table 31, the protocol conversion portion 24 converts the data into the nonstandard protocol; the nonstandard protocol communication portion 23 then performs processing for transmission to the non-secure network gateway 11. As a result, data communication is performed from the secure network gateway 12 to the non-secure network gateway 11 using the nonstandard protocol.

Non-secure network gateway transmission processing (S220) is performed by the non-secure network gateway 11 according to data communication from the secure network gateway 12 using the nonstandard protocol in this way. That is, nonstandard protocol communication data is received by the nonstandard protocol communication portion 22, and after referring to the relay permission settings table 30, the protocol conversion portion 21 converts the data to the standard protocol; then the standard protocol communication portion 20 performs processing to transmit the data to the wide-area network 1 using the standard protocol. As a result, data communication using the standard protocol from the non-secure network gateway 11 to the wide-area network 1 is performed.

In the above-described processing (S110, S120, S210, S220) in the non-secure network gateway 11 and secure network gateway 12, the protocol conversion portions 21, 24 refer to the relay permission settings tables 30 and 31, and when relaying is not permitted for the transmission source or destination of the communication data, the communication data is discarded.

Advantageous Effect

By means of the security gateway system of the first embodiment as described above, the following advantageous effect is obtained.

First, the non-secure network gateway and the secure network gateway, which are realized by mutually independent computers, are physically separated, and communication between these sub-gateways is performed by means of a nonstandard protocol the specifications of which have not been published. Hence when illicit communication data from the non-secure network penetrates into the non-secure network gateway, at the stage of protocol conversion of the communication data, the relay permission settings table is referred to, and the fact that the communication data is illicit can easily be confirmed, and the communication data discarded or other appropriate processing performed, so that intrusion of the illicit communication data into the secure network gateway can be prevented. By this means, the security of the secure network can be enhanced.

The nonstandard protocol communication portion in each of the sub-gateways has an implemented application layer which is a seventh layer of the Open Systems Interconnection (OSI) model, and for the lower layers in the range corresponding to the first through sixth layers, unpublished and original communication layers are implemented separately from the lower layers of the standard protocol communication portion, so that data exchange between the nonstandard protocol communication portion and the standard protocol communication portion within the same sub-gateway is performed only in the seventh or application layer. As a result, illicit communication data which has penetrated into the standard protocol communication portion of one of the sub-gateways can be prevented from penetrating from the lower layers into the nonstandard protocol communication portion.

That is, in general when using IP or another standard protocol, communication layers in the Open Systems Interconnection (OSI) model have specifications enabling data exchange with other layers on the same level. Hence in contrast with this embodiment, when a standard protocol is simply used to connect the communication portion connected to a non-secure network with a communication portion connected to a secure network, unfortunately, lower layers can relay data by circumventing communication with upper layers.

On the other hand, in this embodiment, data communication between the standard protocol communication portion connected to the non-secure network and the standard protocol communication portion connected to the secure network is performed via nonstandard protocol communication portions, which has implemented original communication layers, the specifications of which are not published, corresponding to the first through sixth layers of the Open Systems Interconnection (OSI) model, so that circumvention and relaying of data in the range from the OSI first to sixth layers is not possible. Consequently data communication between the standard protocol communication portion and the nonstandard protocol communication portion can be performed only in the OSI seventh or application layer.

Hence even in cases where spoofed packets or other illicit communication data from the non-secure network penetrates a security hole in the standard protocol communication portion of the non-secure network gateway, penetration into the nonstandard protocol communication portion can be prevented, so that penetration of illicit communication data into the secure network can be prevented, and in this respect also, security of the secure network can be enhanced.

Further, even in a case in which the relay permission settings table of the non-secure network gateway has been overwritten by illicit communication data which has penetrated from the non-secure network, because communication between the sub-gateways is performed using a nonstandard protocol the specifications of which have not been published, the illicit communication data cannot penetrate into the secure network gateway and overwrite the relay permission settings table. Hence in such a case, by detecting an anomaly based on a mismatch between the information stored in the relay permission settings table in the secure network gateway and the transmission source or destination comprised by the illicit communication data, and by discarding the illicit communication data or performing other appropriate processing, penetration of the illicit communication data into the secure network can be prevented; in this respect also, security of the secure network can be enhanced.

Moreover, when a DoS (Denial of Service) attack is received by a server connected to the secure network and which is providing various services, the non-secure network gateway is affected by the attack, but the nonstandard protocol communication portion of the non-secure network gateway is not provided with applications (ftp, telnet, and similar), positioned on the OSI seventh layer, which provide various standard services. For this reason, the DoS attack data is not relayed to the secure network gateway, and the attack does not reach servers of the secure network, so that server services can be continued. Hence in this respect also, security of the secure network can be enhanced.

Further, by using a nonstandard protocol for communication between the two sub-gateways as described above, security and reliability can be improved, and in addition each of the sub-gateways and the networks to which they are connected can communicate using a standard protocol. Hence legitimate users can easily utilize servers protected by a system of this invention, employing methods (such as ftp, SQL, and similar) similar to those used in ordinary connections to networks, without the need for special protocols or languages or for other special measures, so that there are no drawbacks with respect to user-friendliness. And, communication functions between sub-gateways can easily be realized by utilizing a dedicated and original transport layer API or similar.

Specific Example of Security Gateway Processing

Below, specific examples of specific data processing procedures for enhancing security are described, as specific security gateway processing by the security gateway system 10 of the above-described first embodiment.

FIG. 4 through FIG. 7 are flowcharts showing the processing procedure when the sub-gateways 11, 12 wait for packet data reception, as examples of processing procedures for the non-secure network gateway reception processing (S110), secure network gateway transmission processing (S120), secure network gateway reception processing (S210), and non-secure network gateway transmission processing (S220), shown in FIG. 3.

Also, FIG. 8 and FIG. 9 show examples of the configuration of data stored in the relay permission settings tables 30, 31 of the non-secure network gateway 11 and secure network gateway 12. In these examples, transmission source permission information comprising transmission source addresses, and protocol numbers, port numbers, as well as destination permission information comprising port numbers and destination addresses, are stored in the relay permission settings tables 30, 31.

Because the security gateway system 10 normally performs data relaying for a plurality of transmission sources and destinations, normally a plurality of transmission source addresses and a plurality of destination addresses are set in the transmission source permission information and destination permission information, as shown in FIG. 8 and FIG. 9.

Below, details of the processing procedures shown in FIG. 4 through FIG. 7 are explained in order, for cases in which the relay permission settings tables 30, 31 shown in FIG. 8 and FIG. 9 are used.

Figure 4:
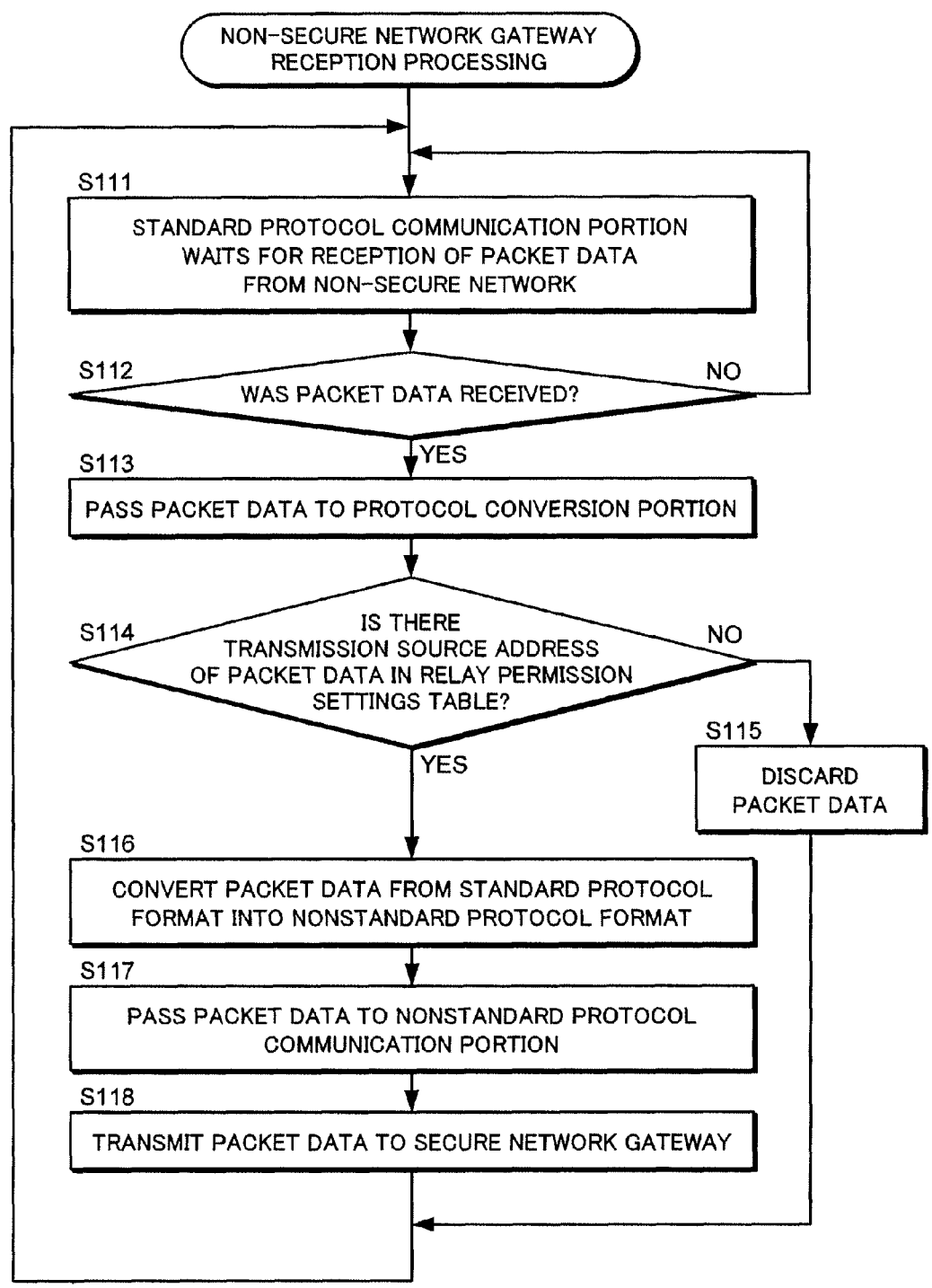
FIG. 4 is a flowchart showing an example of the processing procedure for the non-secure network gateway reception processing in FIG. 3.

As shown in FIG. 4, in the non-secure network gateway reception processing (S110), the standard protocol communication portion 20 of the non-secure network gateway 11 refers to the relay permission settings table 30 in the non-secure network gateway 11, and waits for reception of packet data from the non-secure network 1 according to the transmission source permission information (S111). Upon receiving packet data from the non-secure network 1 ("YES" in S112), the standard protocol communication portion 20 passes this packet data to the protocol conversion portion 21 (S113).

The protocol conversion portion 21 compares the transmission source address of the received packet data with the transmission source addresses in the transmission source permission information of the relay permission settings table 30 shown in FIG. 8, and judges whether there is a matching transmission source address (S114). If there is no matching transmission source address ("NO" in S114), the received packet data is discarded (S115), and processing returns to S110 to await reception of the next packet data.

When a transmission source address which matches the transmission source address of the received packet data is present in the relay permission settings table 30 ("YES" in S114), the protocol conversion portion 21 converts the received packet data from the standard protocol format into the nonstandard protocol format (S116), and passes the converted packet data to the nonstandard protocol communication portion 22 (S117).

The nonstandard protocol communication portion 22 refers to the destination permission information of the relay permission settings table 30 shown in FIG. 8, and if the address of the secure network gateway 12 is set as a destination address, performs communication using the nonstandard protocol to transmit the packet data to the nonstandard protocol communication portion 23 of the secure network gateway 12 (S118).

By means of the non-secure network gateway reception processing (S110) described above, packet data in the standard protocol format received by the non-secure network gateway 11 from the non-secure network 1 is converted into the nonstandard protocol format and is passed to the secure network gateway 12.

Figure 5:
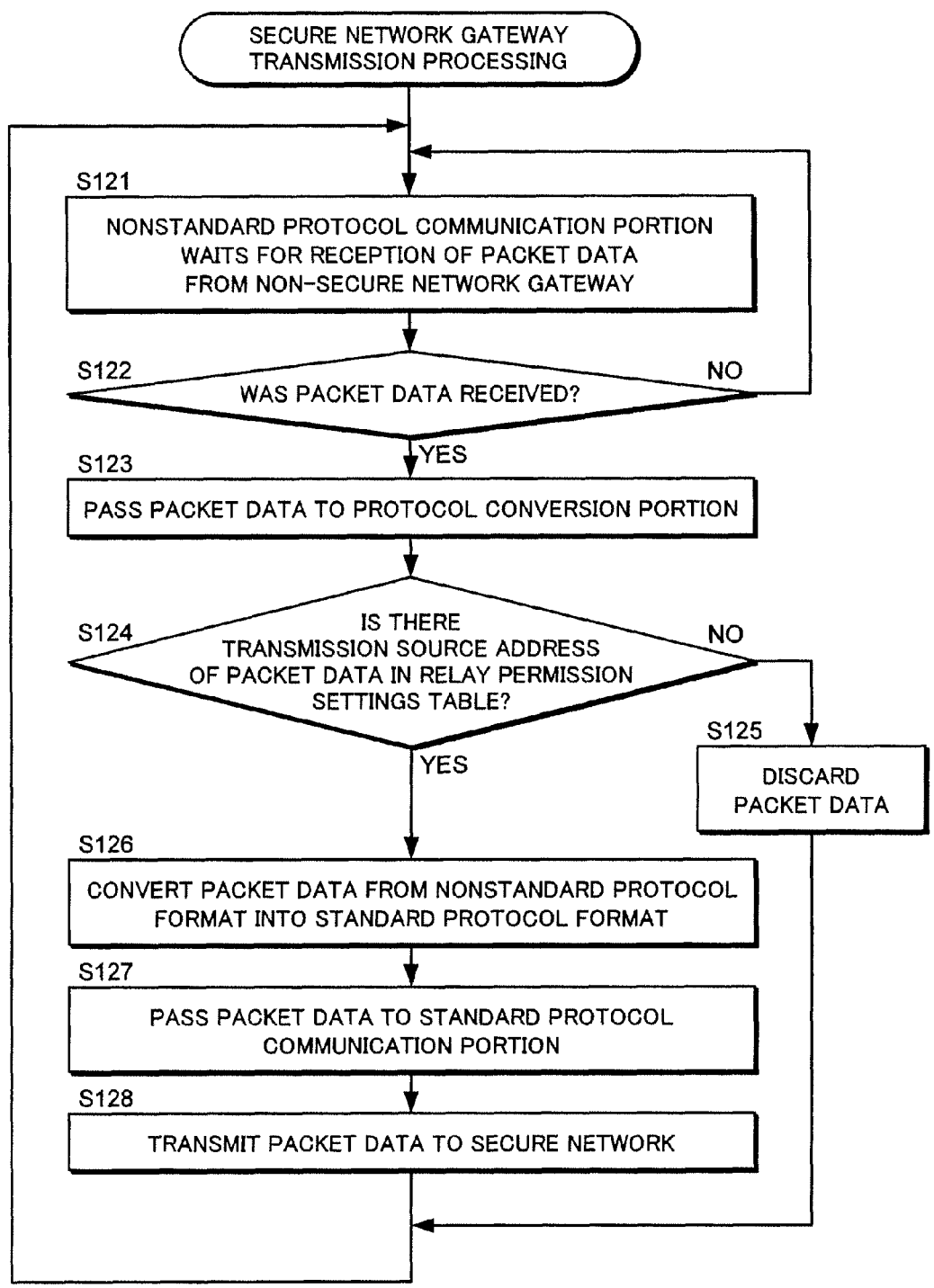
FIG. 5 is a flowchart showing an example of the processing procedure for the secure network gateway transmission processing in FIG. 3.

As shown in FIG. 5, in the secure network gateway transmission processing (S120), the nonstandard protocol communication portion 23 of the secure network gateway 12 refers to the relay permission settings table 31 in the secure network gateway 12, and waits for reception of packet data from the non-secure network gateway 11 conforming to the transmission source permission information (S121). Upon receiving packet data from the nonstandard protocol communication portion 22 of the non-secure network gateway 11 ("YES" in S122), the nonstandard protocol communication portion 23 passes the packet data to the protocol conversion portion 24 (S123).

The protocol conversion portion 24 compares the transmission source address of the received packet data with the transmission source addresses in the transmission source permission information of the relay permission settings table 31 shown in FIG. 9, and judges whether there is a matching transmission source address (S124). If there is no matching transmission source address ("NO" in S124), the received packet data is discarded (S125), and processing returns to S120 to await reception of the next packet data.

If a transmission source address matching the transmission source address of the received packet data exists in the relay permission settings table 31 ("YES" in S124), the protocol conversion portion 24 converts the received packet data from the nonstandard protocol format to the standard protocol format (S126), and passes the converted packet data to the standard protocol communication portion 25 (S127).

The standard protocol communication portion 25 refers to the destination permission information of the relay permission settings table 31 shown in FIG. 9, and when an address in the secure network 2 is set as the destination address, performs communication using the standard protocol to transmit the packet data to the address in the secure network 2 (S128).

By means of the secure network gateway transmission processing (S120) described above, packet data from the non-secure network gateway 11, received by the secure network gateway 12 in the nonstandard protocol format, is converted into the standard protocol format and transmitted to the secure network 2.

Figure 6:
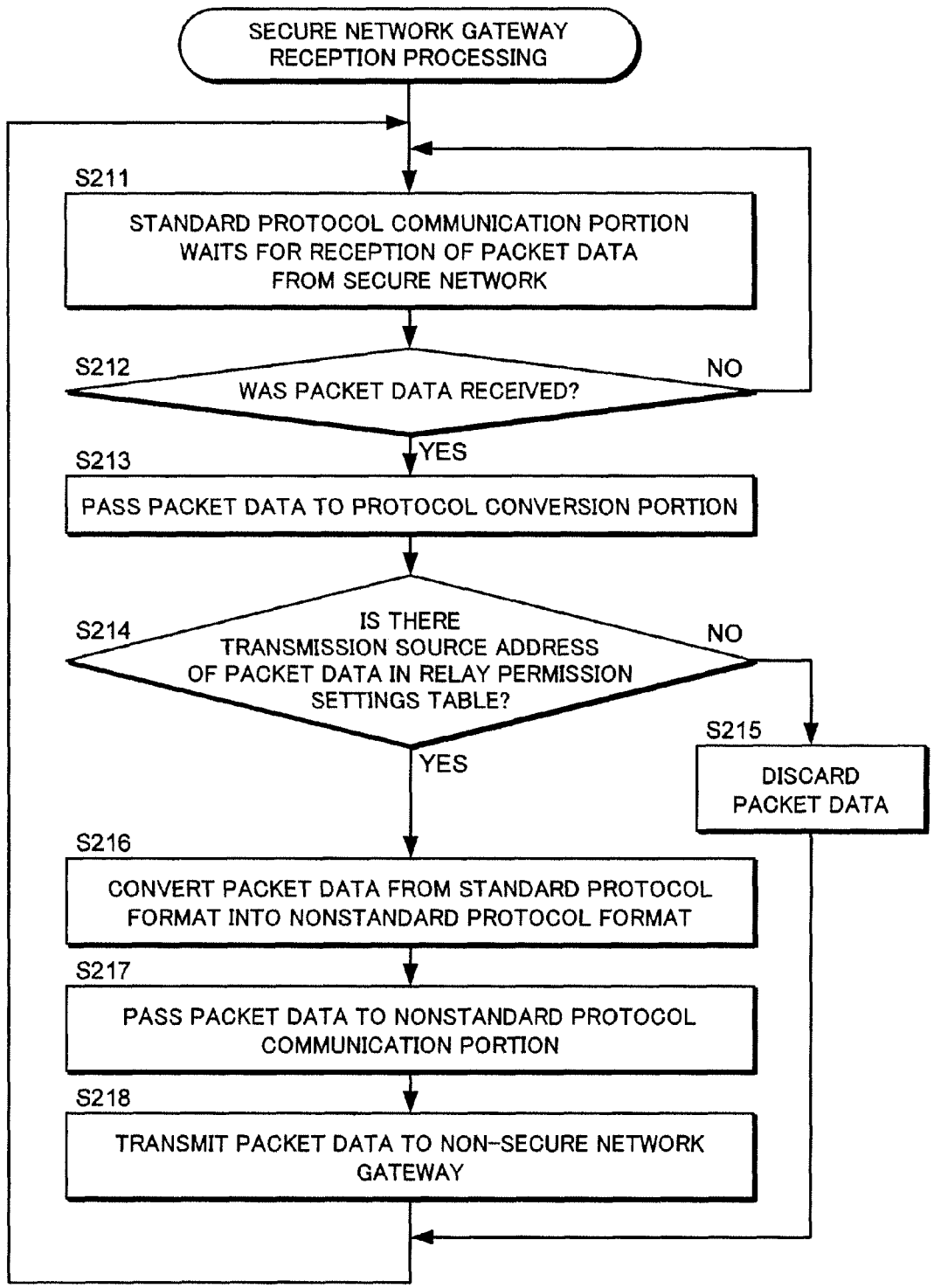
FIG. 6 is a flowchart showing an example of the processing procedure for the secure network gateway reception processing in FIG. 3.

As shown in FIG. 6, in secure network gateway reception processing (S210), the standard protocol communication portion 25 of the secure network gateway 12 refers to the relay permission settings table 31 in the secure network gateway 12, and waits for reception of packet data from the secure network 2 conforming to the transmission source permission information (S211). Upon receiving packet data from the secure network 2 ("YES" in S212), the standard protocol communication portion 25 passes the packet data to the protocol conversion portion 24 (S213).

The protocol conversion portion 24 compares the transmission source address of the received packet data with the transmission source addresses of transmission source permission information in the relay permission settings table 31 shown in FIG. 9, and judges whether there is a matching transmission source address (S214). If there is no matching transmission source address ("NO" in S214), the received packet data is discarded (S215), and processing returns to S210 to await reception of the next packet data.

Further, when a transmission source address matching the transmission source address in the received packet data is present in the relay permission settings table 31 ("YES" in S214), the protocol conversion portion 24 converts the received packet data from the standard protocol format to the nonstandard protocol format (S216), and passes the converted packet data to the nonstandard protocol communication portion 23 (S217).

The nonstandard protocol communication portion 23 refers to the destination permission information in the relay permission settings table 31 shown in FIG. 9, and if the address of the non-secure network gateway 11 is set in the destination addresses, performs communication using the nonstandard protocol to transmit the packet data to the non-standard protocol communication portion 22 of the non-secure network gateway 11 (S218).

By means of the above-described secure network gateway reception processing (S210), packet data received from the secure network 2 by the secure network gateway 12 in the standard protocol format is converted into the nonstandard protocol format and is passed to the non-secure network gateway 11.

Figure 7:
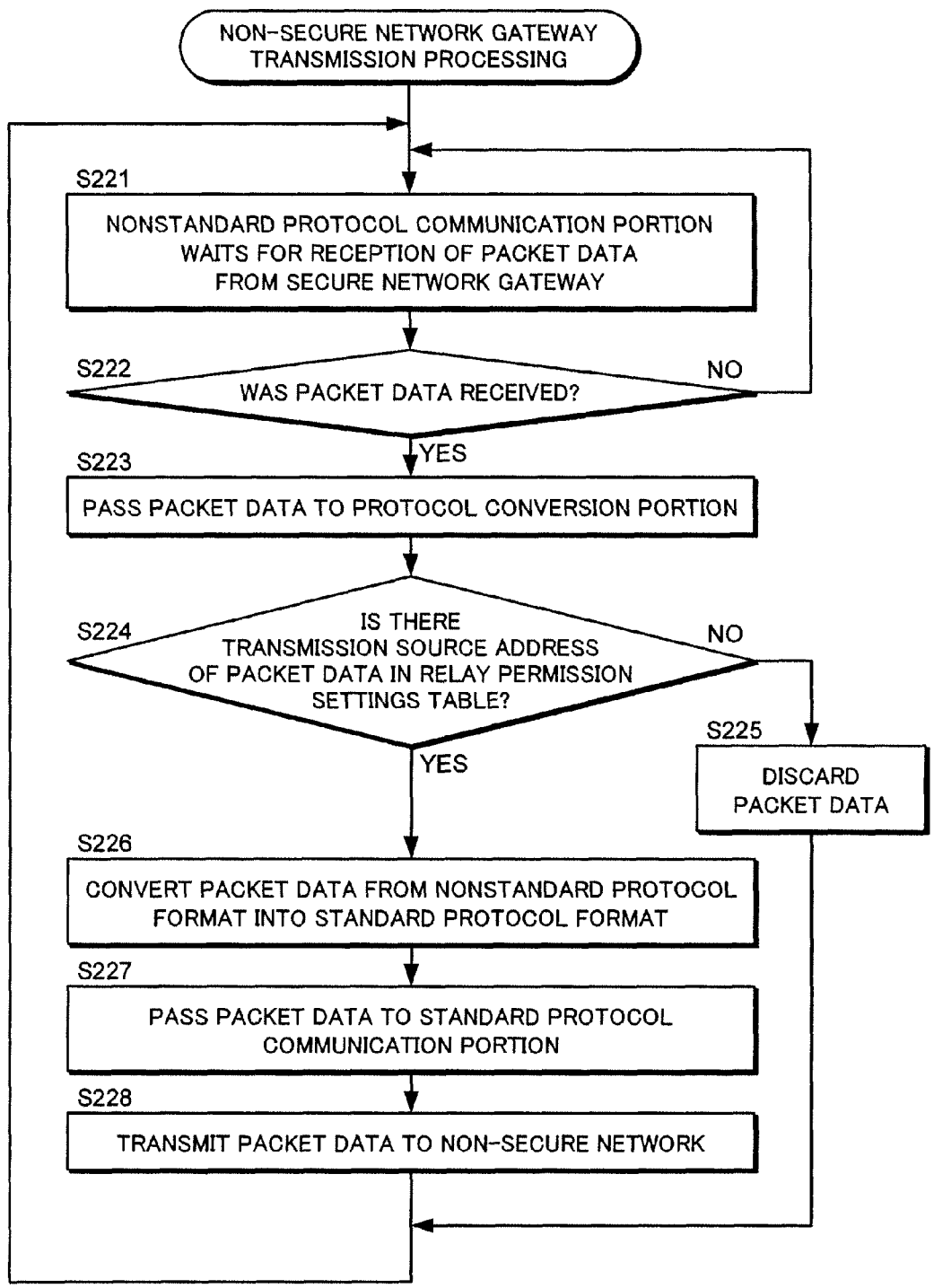
FIG. 7 is a flowchart showing an example of the processing procedure for the non-secure network gateway transmission processing in FIG. 3.

As shown in FIG. 7, in non-secure network gateway transmission processing (S220), the nonstandard protocol communication portion 22 of the non-secure network gateway 11 refers to the relay permission settings table 30 in the non-secure network gateway 11, and waits for reception of packet data from the secure network gateway 12 conforming to the transmission source permission information (S221). Upon receiving packet data from the nonstandard protocol communication portion 23 of the secure network gateway 12 ("YES" in S222), the nonstandard protocol communication portion 22 passes the packet data to the protocol conversion portion 21 (S223).

The protocol conversion portion 21 compares the transmission source address of the received packet data with the transmission source addresses in the transmission source permission information of the relay permission settings table 30 shown in FIG. 8, and judges whether there is a matching transmission source address (S224). If there is no matching transmission source address ("NO" in S224), the received packet data is discarded (S225), and processing returns to S220 to await reception of the next packet data.

If a transmission source address matching the transmission source address of the received packet data exists in the relay permission settings table 30 ("YES" in S224), the protocol conversion portion 21 converts the received packet data from the nonstandard protocol format to the standard protocol format (S226), and passes the converted packet data to the standard protocol communication portion 20 (S227).

The standard protocol communication portion 20 refers to the destination permission information in the relay permission settings table 30 shown in FIG. 8, and when an address in the non-secure network 1 is set as the destination address, performs communication using the standard protocol to transmit the packet data to the address in the non-secure network 1 (S228).

By means of the non-secure network gateway transmission processing (S220) described above, packet data from the secure network gateway 12, received by the non-secure network gateway 11 in the nonstandard protocol format, is converted into the standard protocol format and transmitted to the non-secure network 1.

By means of the security gateway processing of the above-described FIG. 4 through FIG. 7, in addition to the advantageous results of the first embodiment, the following advantageous results are further obtained.

That is, in the non-secure network gateway 11 and the secure network gateway 12, when receiving packet data from the other sub-gateway, reception of packet data is awaited, and each time packet data is received a judgment of the packet data is performed, so that only packet data for which relaying is permitted can be relayed to the destination network.

Such processing of packet data by each sub-gateway is performed separately and independently from the communication functions of the other sub-gateway, and consequently the networks are separated, so that secure data exchange between the networks can be achieved. Moreover, the secure network can be protected from security threats in the non-secure network, so that security of the secure network can be enhanced.

Second Embodiment

Figure 10:
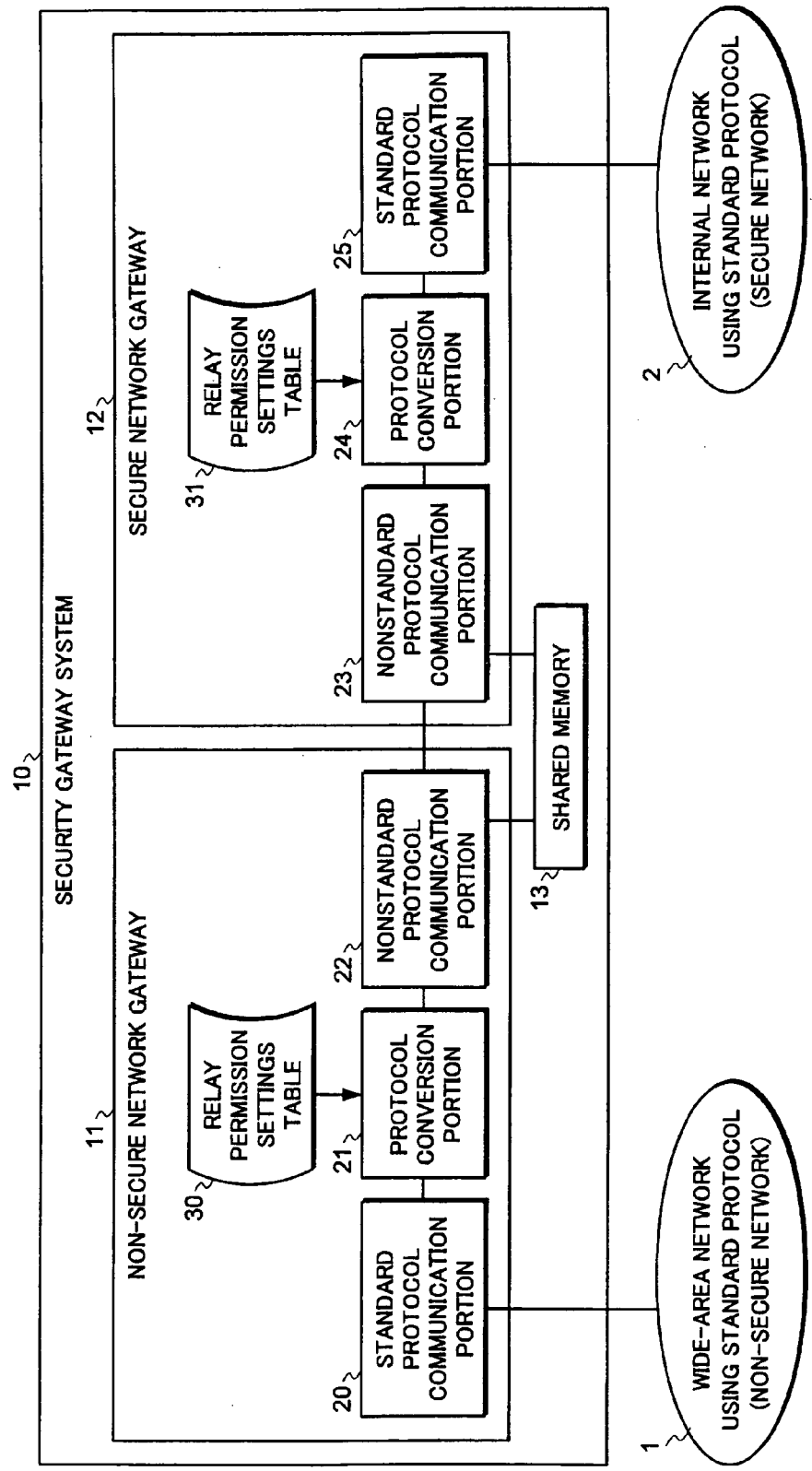
FIG. 10 shows the configuration of the security gateway system of a second embodiment to which the invention is applied.

FIG. 10 shows the configuration of the security gateway system of a second embodiment to which this invention is applied. As shown in FIG. 10, the security gateway system 10 of this embodiment adds, to the configuration of the first embodiment, shared memory 13, which can be accessed by the nonstandard protocol communication portions 22, 23 of the non-secure network gateway 11 and secure network gateway 12. And, the security gateway is configured such that data is exchanged by accessing the shared memory 13, without direct communication between the nonstandard protocol communication portions 22 and 23.

A summary of operation of the security gateway system 10 of this embodiment, configured as described above, is shown in FIG. 3; the specific data processing procedures are as shown in FIG. 11 through FIG. 14. That is, FIG. 11 through FIG. 14 are flowcharts showing examples of the processing procedures in this embodiment, using shared memory 13, for non-secure network gateway reception processing (S110), secure network gateway transmission processing (S120), secure network reception processing (S210), and non-secure network gateway transmission processing (S220).

Below, details of the processing procedures shown in FIG. 11 through FIG. 14 are explained in order.

Figure 11:
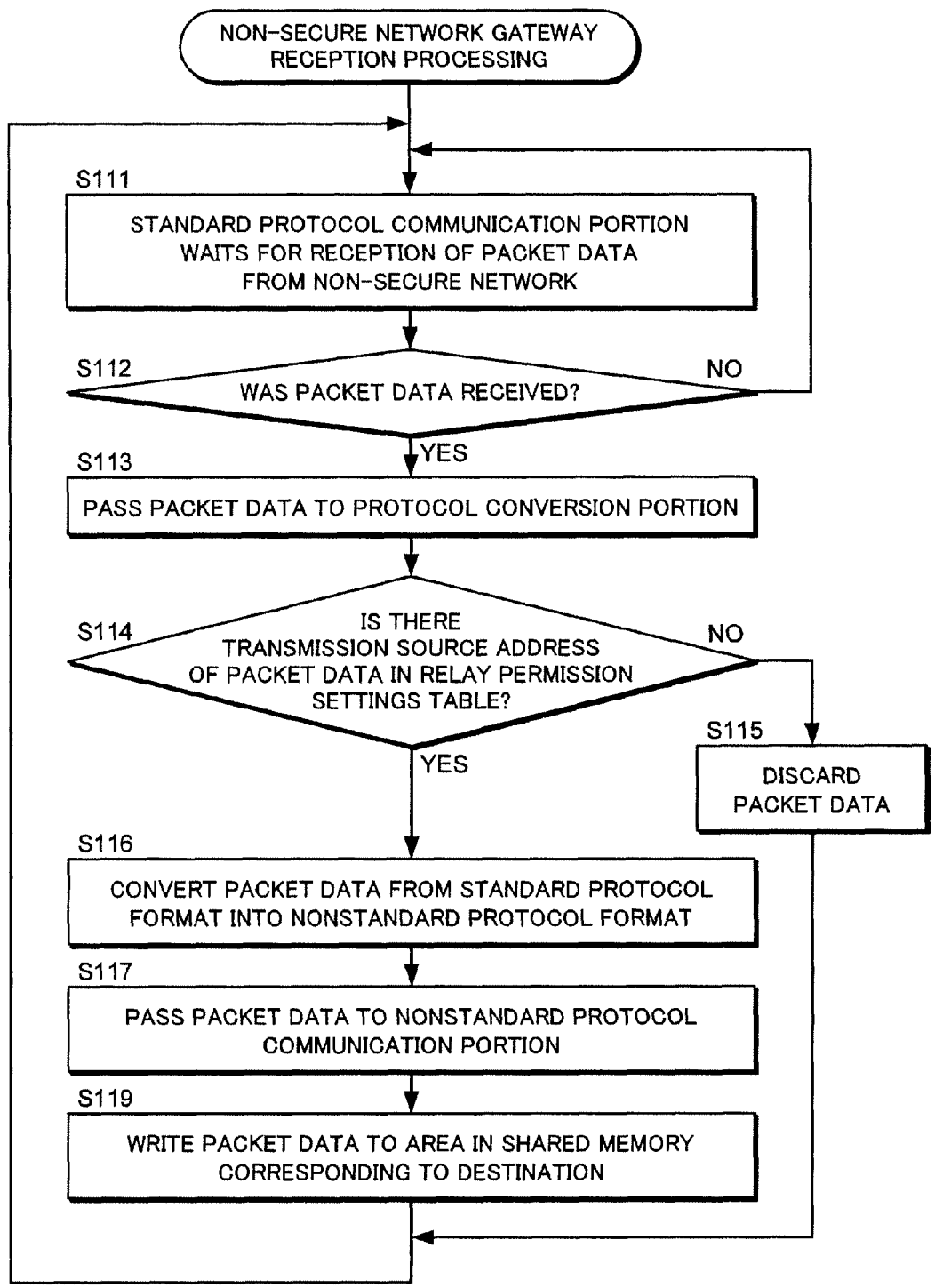
FIG. 11 is a flowchart showing an example of the processing procedure for the non-secure network gateway reception processing of the second embodiment.

As shown in FIG. 11, in the non-secure network gateway reception processing (S110) of this embodiment, the series of processing (S111 to S117) in which packet data reception by the standard protocol portion 20 of the non-secure network gateway 11 is awaited, relay permission for the transmission source of packet data is confirmed by the protocol conversion portion 21, and the packet data is either discarded or is converted to the nonstandard protocol format and passed to the nonstandard protocol communication portion 22 according to the result, is similar to the series of processing designated by the same symbols (S111 to S117) in FIG. 4.

The non-secure network gateway reception processing (S110) of this embodiment differs from the processing shown in FIG. 4 in that the nonstandard protocol communication portion 22 does not transmit received packet data, in the nonstandard protocol format, to the secure network gateway 12, but instead writes the packet data to shared memory 13 (S119). That is, in this processing (S119), the nonstandard protocol communication portion 22 refers to the destination permission information in the relay permission settings table 30, and writes packet data to an area in shared memory 13 corresponding to the destination.

Figure 12:
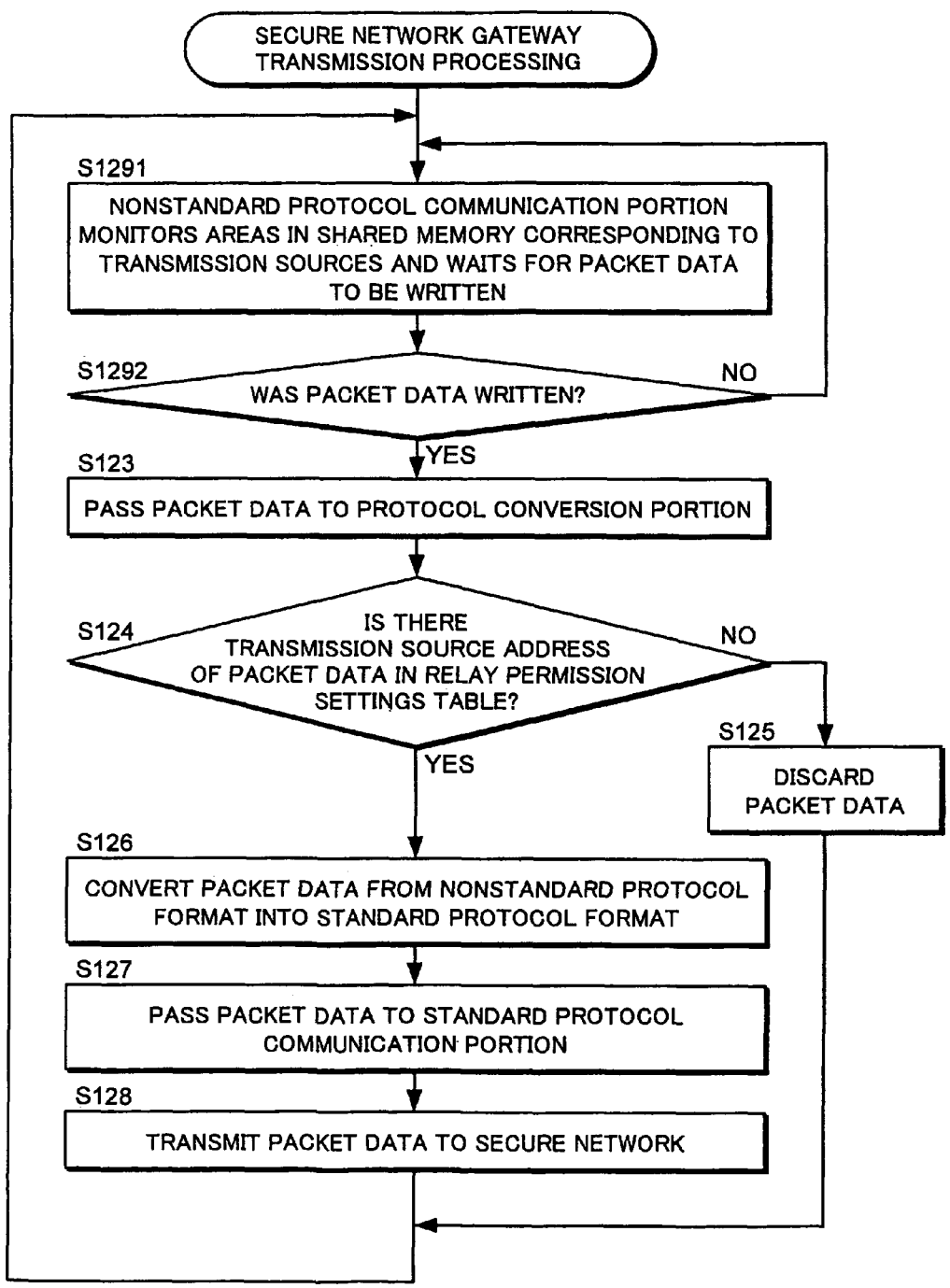
FIG. 12 is a flowchart showing an example of the processing procedure for the secure network gateway transmission processing of the second embodiment.

As shown in FIG. 12, in the secure network gateway transmission processing (S120) of this embodiment, the nonstandard protocol communication portion 23 of the secure network gateway 12 refers to the relay permission settings table 31 in the secure network gateway 12, monitors the areas corresponding to transmission source in the shared memory 13 according to the transmission sources permission information, monitors the writing of packet data, and waits for packet data to be written (S1291). The nonstandard protocol communication portion 23, upon detecting writing of packet data to the shared memory 13 (S1292) by the nonstandard protocol communication portion 22 of the non-secure network gateway 11, passes the packet data to the protocol conversion portion 24 (S123).

In the secure network gateway transmission processing (S120) of this embodiment, the series of processing (S124 to S128) in which the protocol conversion portion 24 confirms the relay permission for the transmission source of packet data, either discards the packet data or converts the data to the standard protocol format and passes the data to the standard protocol communication portion 25, is similar to the series of processing denoted by the same symbols (S124 to S128) shown in FIG. 5.

Figure 13:
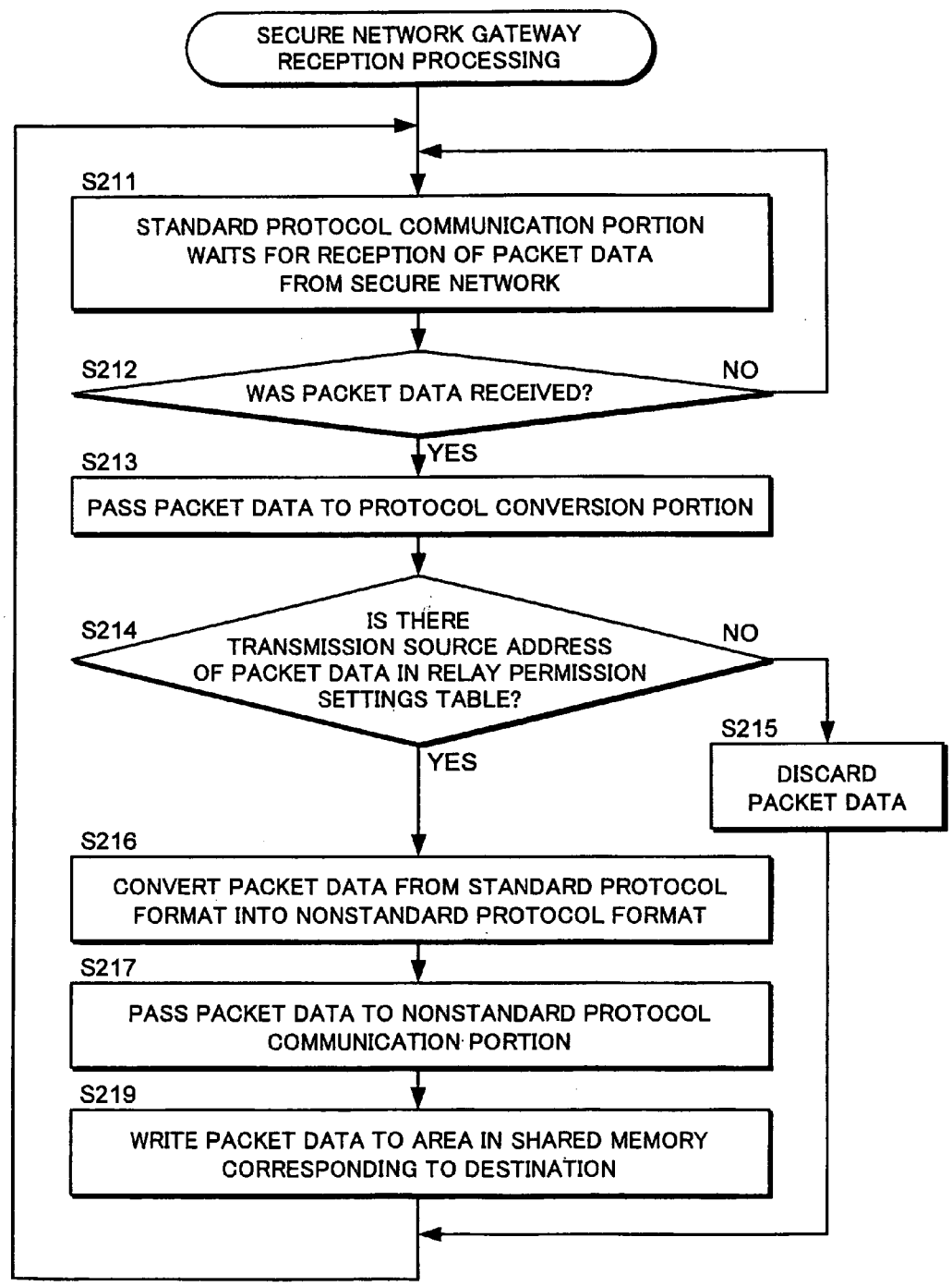
FIG. 13 is a flowchart showing an example of the processing procedure for the secure network gateway reception processing of the second embodiment.

As shown in FIG. 13, in the secure network gateway reception processing (S210) of this embodiment, the series of processing (S211 to S217) in which the standard protocol communication portion 25 of the secure network gateway 12 waits for packet data reception, and the protocol conversion portion 24 confirms relay permission for the packet data transmission source and either discards the packet data or converts the data to the nonstandard protocol format and passes the data to the nonstandard protocol communication portion 23, is similar to the series of processing denoted by the same symbols (S211 to S217) in FIG. 6.

The secure network gateway reception processing (S210) of this embodiment differs from the processing shown in FIG. 6 in that the nonstandard protocol communication portion 23 does not transmit the received packet data in nonstandard protocol format to the non-secure network gateway 11, but instead writes the data to shared memory 13 (S219). That is, in this processing (S219), the nonstandard protocol communication portion 23 refers to the destination permission information in the relay permission settings table 31, and writes the packet data to the corresponding area in shared memory 13 according to the destination.

Figure 14:
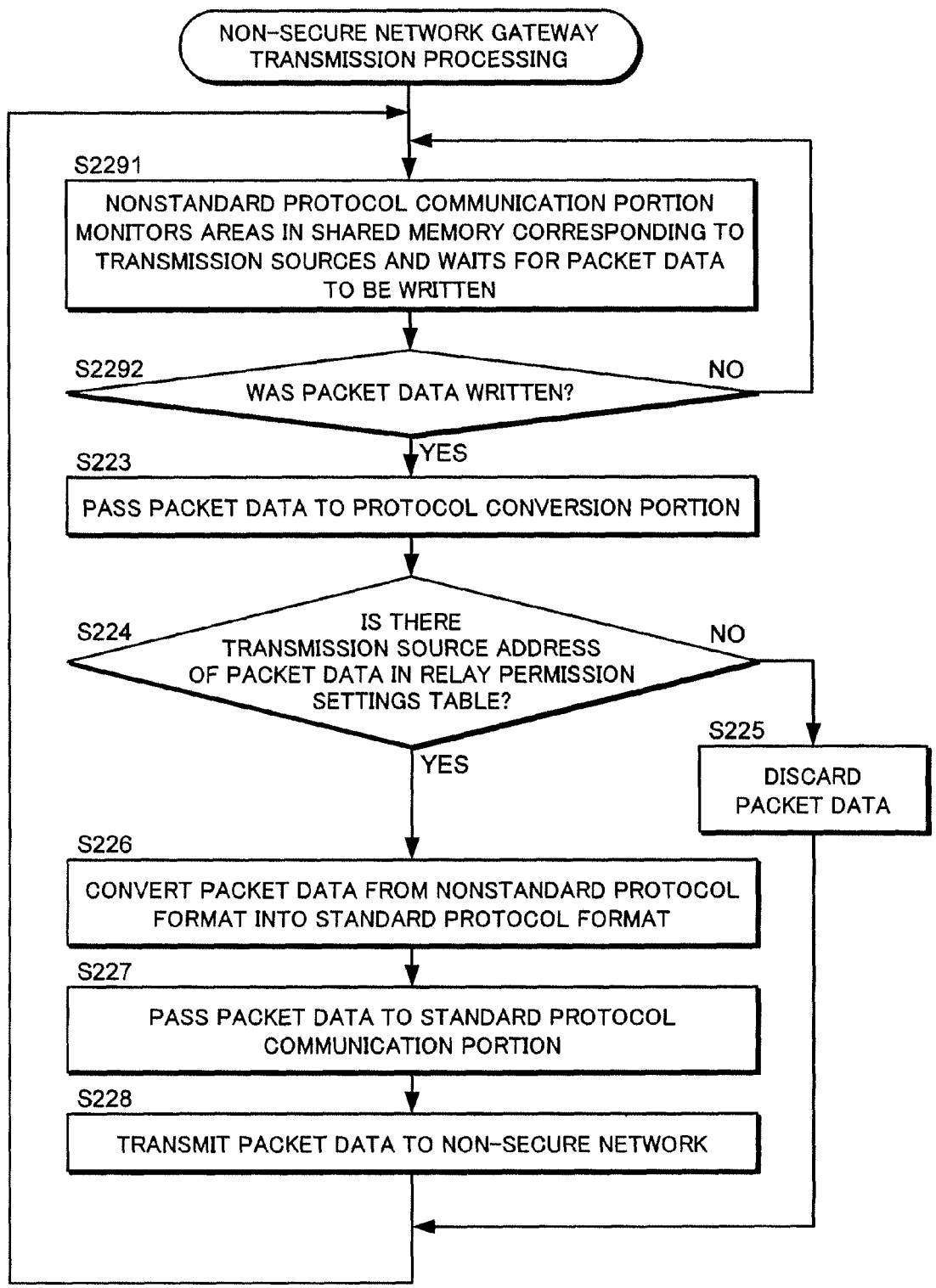
FIG. 14 is a flowchart showing an example of the processing procedure for the non-secure network gateway transmission processing of the second embodiment.

As shown in FIG. 14, in the non-secure network gateway transmission processing (S220) of this embodiment, the nonstandard protocol communication portion 22 of the non-secure network gateway 11 refers to the relay permission settings table 30 in the non-secure network gateway 11, monitors the areas in shared memory 13 corresponding to transmission sources according to the transmission source information, monitors the writing of packet data, and waits for packet data writing (S2291). The nonstandard protocol communication portion 22, upon detecting writing of packet data to the shared memory 13 (S2292) by the nonstandard protocol communication portion 23 of the secure network gateway 12, passes the packet data to the protocol conversion portion 21 (S223).

In the non-secure network gateway transmission processing (S220) of this embodiment, the series of processing (S224 to S228) in which the protocol conversion portion 21 confirms relay permission for the transmission source of packet data, and either discards the packet data or converts the data to the standard protocol format and passes the data to the standard protocol communication portion 20 according to the result, is similar to the series of processing denoted by the same symbols (S224 to S228) in FIG. 7.

By means of the security gateway system of the second embodiment described above, in addition to the advantageous results of the first embodiment, the following advantageous results are further obtained.

That is, in the non-secure network gateway 11 and the secure network gateway 12, packet data is exchanged by accessing the shared memory, without direct communication between the sub-gateways, so there exist no connections with communication functions at all between the sub-gateways, and consequently the networks are completely separated, so that secure data exchange between the networks can be achieved. Hence the secure network can be protected from security threats within the non-secure network, and security of the secure network can be enhanced.

Third Embodiment

Figure 15:
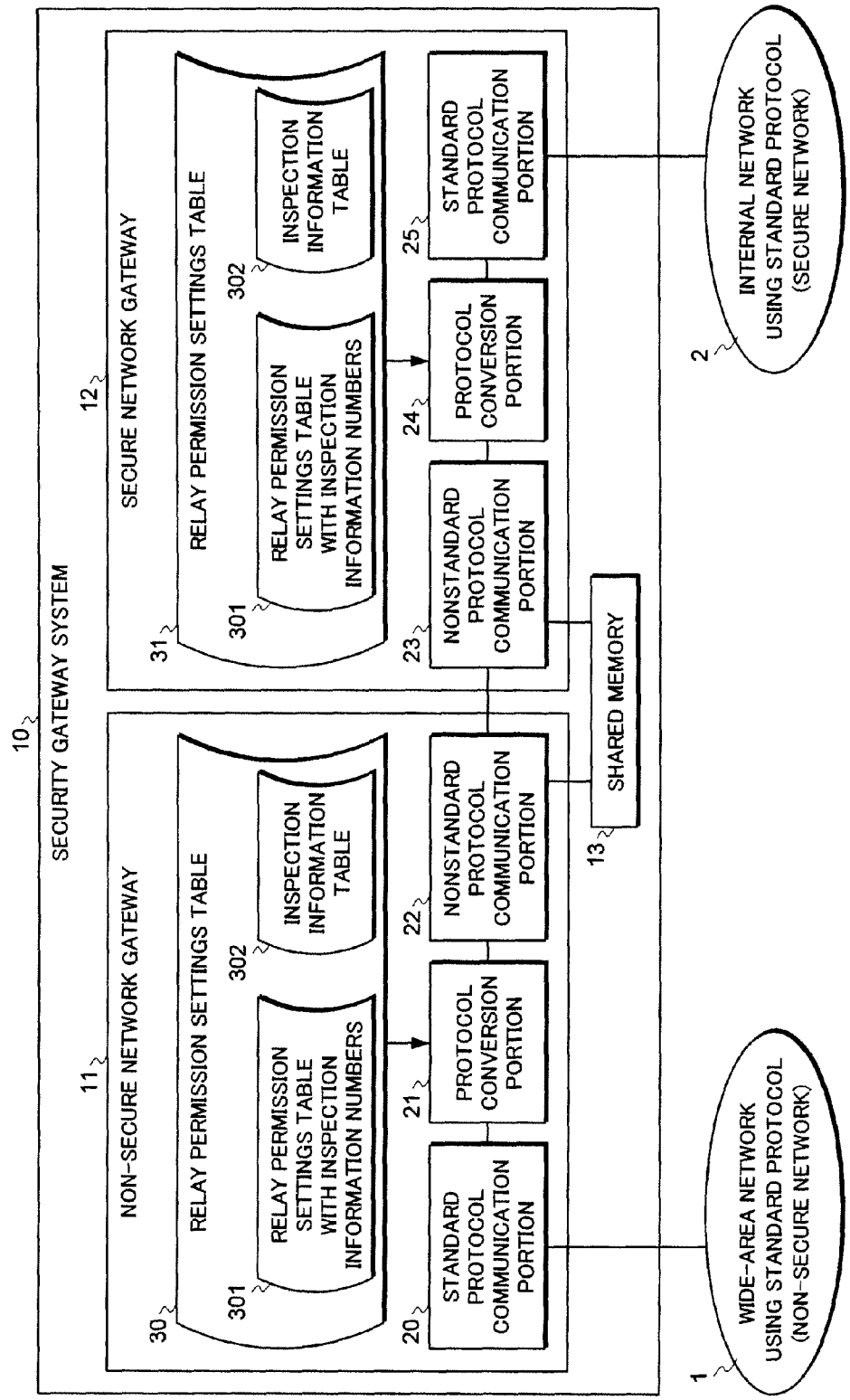
FIG. 15 shows the configuration of the security gateway system of a third embodiment to which the invention is applied.

FIG. 15 shows the configuration of the security gateway system of a third embodiment to which this invention is applied. As shown in FIG. 15, the security gateway system 10 of this embodiment adds, to the configuration of the second embodiment, content inspection information to perform content inspections of packet data to the relay permission settings tables 30, 31 of the non-secure network gateway 11 and secure network gateway 12.

Here, the relay permission settings tables 30, 31 comprise a relay permission settings table with inspection information numbers 301, and an inspection information table 302. FIG. 16 shows an example of the data configuration of a relay permission settings table with inspection information numbers 301; to the transmission source permission information and destination permission information such as that shown in FIG. 8 and FIG. 9 are added inspection information numbers. FIG. 17 shows an example of the data configuration of an inspection information table 302 storing inspection information corresponding to the inspection information numbers in the relay permission settings table with inspection information numbers 301 shown in FIG. 16; information including inspection information numbers, conditions, and judgment conditions is stored.

In this embodiment, when the protocol conversion portions 21, 24 refer to the relay permission settings table with inspection information numbers 301 as shown in FIG. 16 and confirm the transmission source, if an inspection information number is set, an inspection information table such as shown in FIG. 17 is referred to, and if the inspection result is unsatisfactory, the packet data is discarded.

Here, as the inspection of packet data using the inspection information, a plurality of elements in CSV format, described in the judgment conditions, are individually compared with the packet data. When checking the individual elements specified in CSV format, if there is a match the result is "True", and otherwise the result is "False".

When there are a plurality of individual elements, compound conditions are created in which the logical product of the check results of individual elements is taken for an "AND" condition, the logical sum is taken for an "OR" condition, and the negative logical product is taken for a "NAND" condition. When the condition is "USR", a specially prepared application to perform inspections is called, and when the inspection results indicate a match "True" is returned, otherwise "False" is returned.

The same inspection information number can be set a plurality of times; the results of judgments for each line of the inspection information shown in FIG. 17 are decided in record order, and inspections performed according to logical product conditions between lines.

The protocol conversion portions 21, 24 perform packet data relaying when all inspection results are "True" and when a result is "False" discard the packet data.

By means of the security gateway system of the third embodiment described above, in addition to the advantageous results of the second embodiment, the following advantageous results are obtained.

That is, in addition to confirming relay permission for the transmission source and destination of packet data, inspection of the content of packet data can also be performed. In general, in data communication, data is exchanged between terminals according to rules for data structures; by inspecting packet data for conformance to these rules, the exchange of illicit data can be forbidden, and security can be enhanced.

Fourth Embodiment

Figure 18:
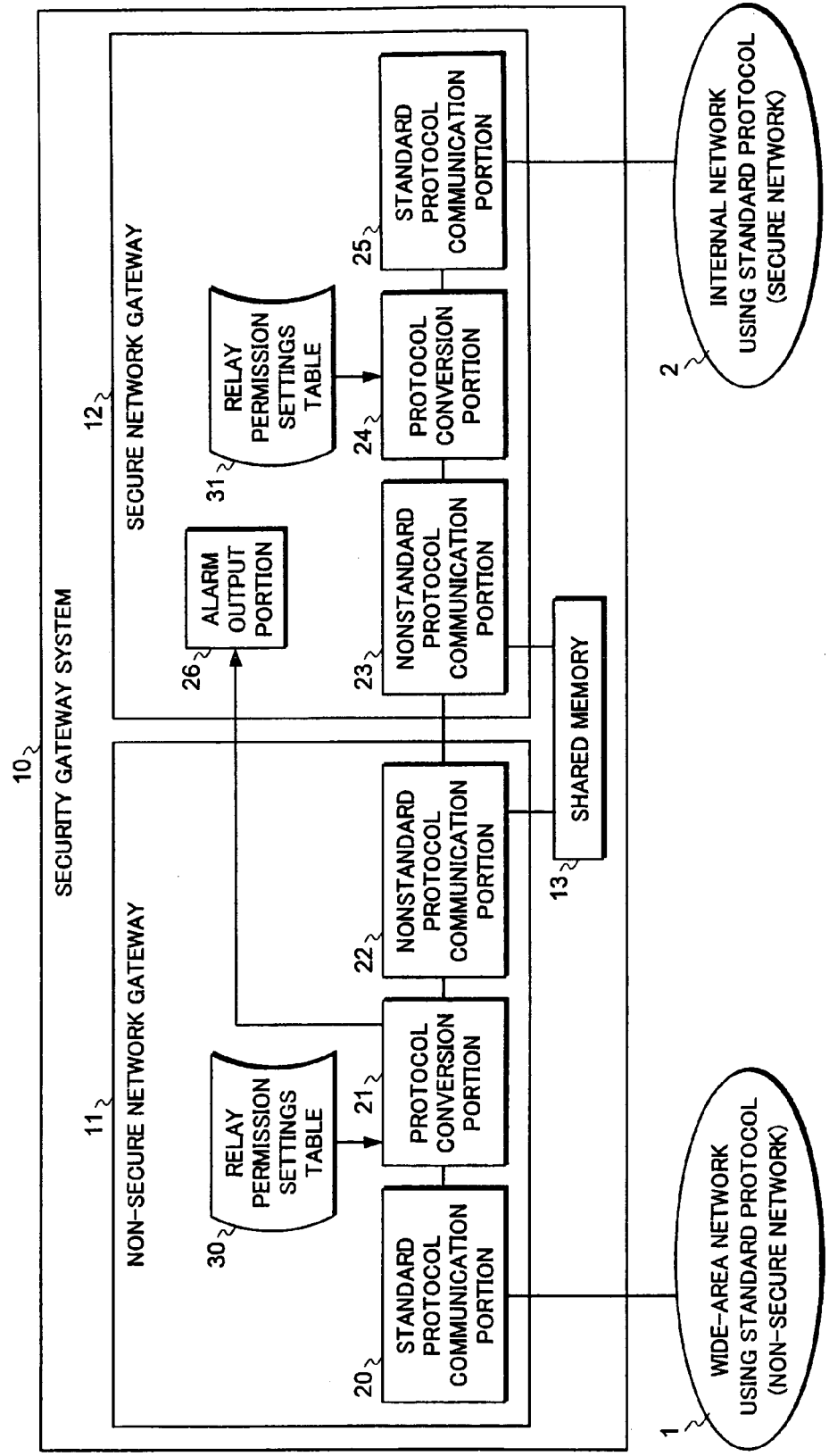
FIG. 18 shows the configuration of the security gateway system of a fourth embodiment to which the invention is applied.

FIG. 18 shows the configuration of the security gateway system of a fourth embodiment to which the invention is applied. As shown in FIG. 18, the security gateway system 10 of this embodiment adds, to the secure network gateway 12 in the configuration of the second embodiment, an alarm output portion 26, which outputs an alarm indicating the occurrence of a security threat. In addition, a function to provide notification of the occurrence of a security threat to the secure network gateway 12 is added to the protocol conversion portion 21 of the non-secure network gateway 11.

In the security gateway system 10 of this embodiment, when as a result of confirmation of relay permission the packet data is discarded, the protocol conversion portion 21 of the non-secure network gateway 11 notifies the alarm output portion 26 of the secure network gateway 12 of the occurrence of a security threat. Upon receiving notification, the alarm output portion 26 of the secure network gateway 12 outputs, by screen display, a flashing light, alarm audio, or other means, an alarm indicating the occurrence of a security threat.

By means of the security gateway system of the fourth embodiment described above, in addition to the advantageous results of the second embodiment, the following advantageous results are obtained.

That is, when illicit packet data is discarded on the side of the non-secure network, an alarm is output conveying this information to the secure network side, so that responsible persons can be notified of the occurrence of a security threat on the side of the non-secure network, the responsible persons can promptly take security-related measures, and the integrity of the secure network can be maintained.

Fifth Embodiment

Figure 19:
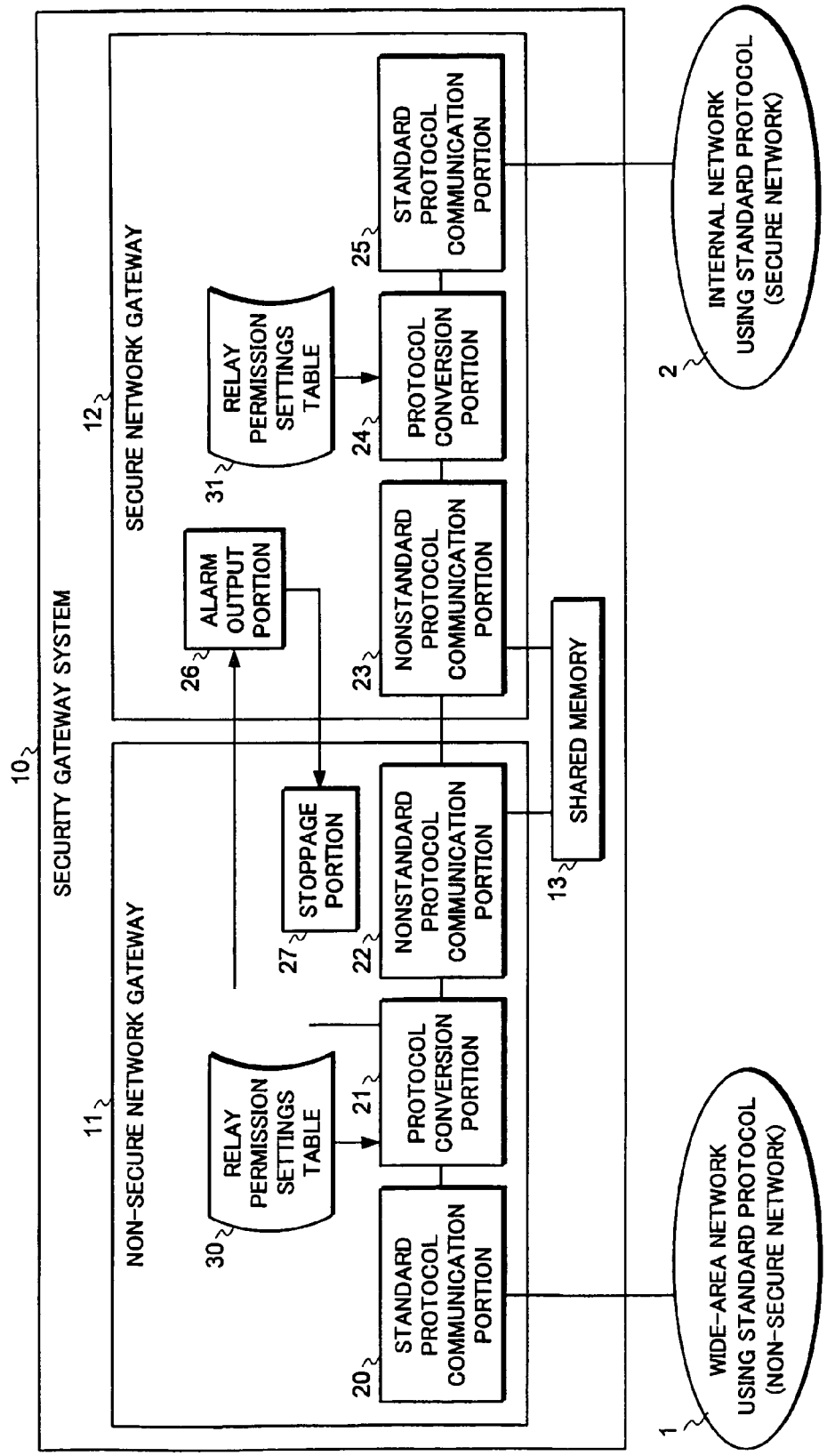
FIG. 19 shows the configuration of the security gateway system of a fifth embodiment to which the invention is applied.

FIG. 19 shows the configuration of the security gateway system of a fifth embodiment to which the invention is applied. As shown in FIG. 19, the security gateway system 10 of this embodiment adds, to the non-secure network gateway 11 in the configuration of the fourth embodiment, a stoppage portion 27 which forcibly stops the non-secure network gateway 11. In addition, a function to transmit a stoppage instruction causing forcible stopping of the non-secure network gateway 11 at the time of alarm output is added to the alarm output portion 26 of the secure network gateway 12.

In the security gateway system 10 of this embodiment, similarly to the fourth embodiment, when the alarm output portion 26 of the secure network gateway 12 is notified by the protocol conversion portion 21 of the non-secure network gateway 11 of the occurrence of a security threat, upon receiving the notification the alarm output portion 26 of the secure network gateway 12 outputs an alarm indicating the occurrence of the security threat.

In this embodiment, the alarm output portion 26 of the secure network gateway 12 outputs an alarm, and simultaneously transmits a stoppage instruction to the stoppage portion 27 of the non-secure network gateway 11. Upon receiving the stoppage instruction, the stoppage portion 27 of the non-secure network gateway 11 forcibly stops the non-secure network gateway 11.

By means of the security gateway system of the fifth embodiment described above, in addition to the advantageous results of the fourth embodiment, the following advantageous results are obtained.

That is, when illicit packet data has been discarded on the non-secure network side, by outputting an alarm to convey this information to the secure network side, not only can an alarm be output to responsible persons indicating the occurrence of a security threat on the non-secure network side, but the non-secure network gateway can be stopped immediately. Hence even when persons responsible cannot immediately take measures in response to the alarm output, security measures can be taken automatically, so that the integrity of the secure network can be maintained.

Sixth Embodiment

Figure 20:
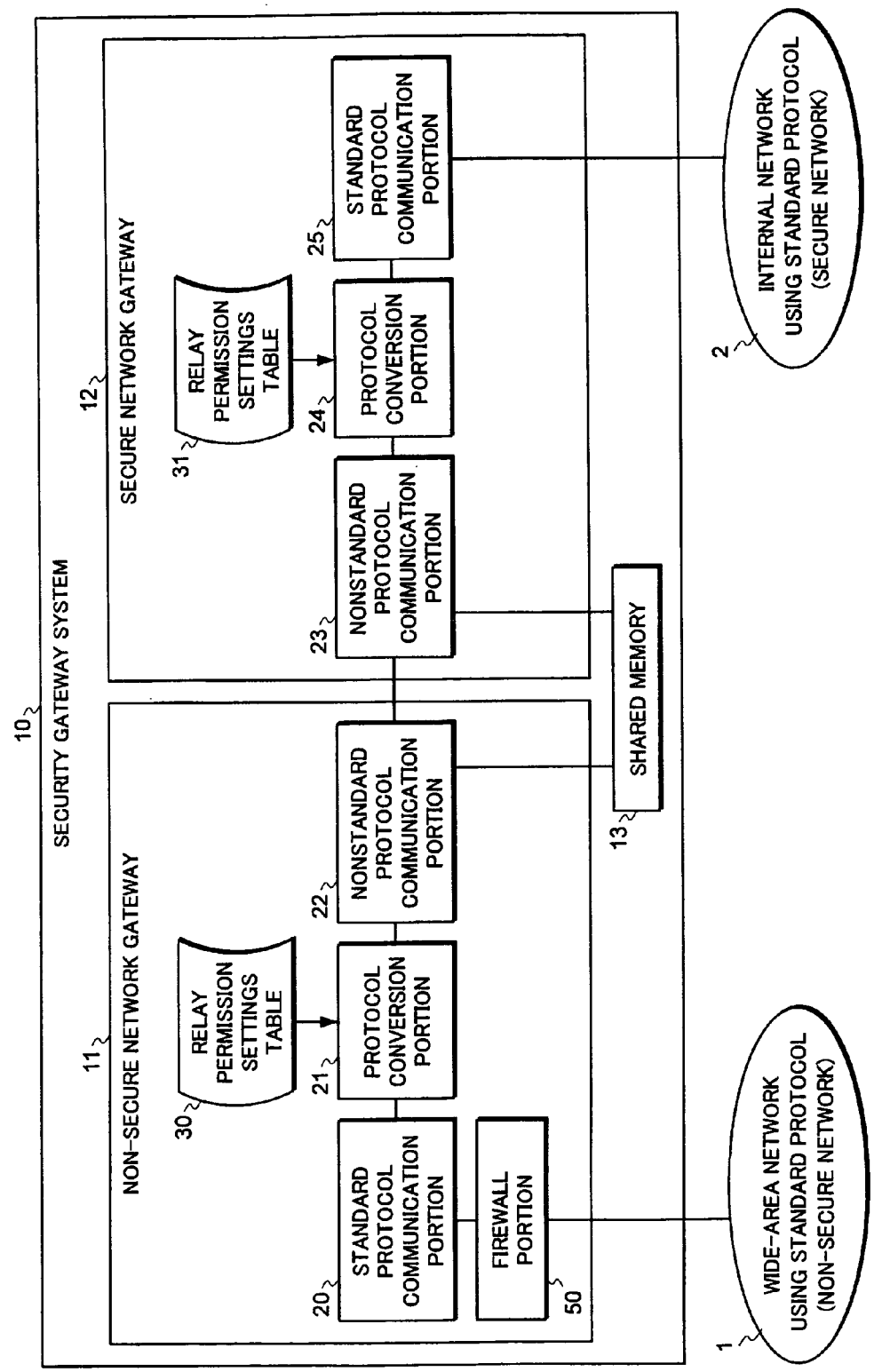
FIG. 20 shows the configuration of the security gateway system of a sixth embodiment to which the invention is applied.

FIG. 20 shows the configuration of the security gateway system of a sixth embodiment to which the invention is applied. As shown in FIG. 20, the security gateway system 10 of this embodiment adds, to the non-secure network gateway 11 in the configuration of the second embodiment, a firewall portion 50.

By means of the security gateway system of the sixth embodiment as described above, in addition to the advantageous results of the second embodiment, the following advantageous results are obtained.

That is, a firewall portion can be made to operate as a first-stage preventive system in response to illicit access from the non-secure network, and even when the defense of the firewall portion has been breached, or when a new security hole has been discovered, or in similar circumstances, the essential secure gateway functions of the security gateway system can be operated as a second defensive system. That is, the security system combines two different defensive system methods, so that security and reliability can be further enhanced.

Figure 21:
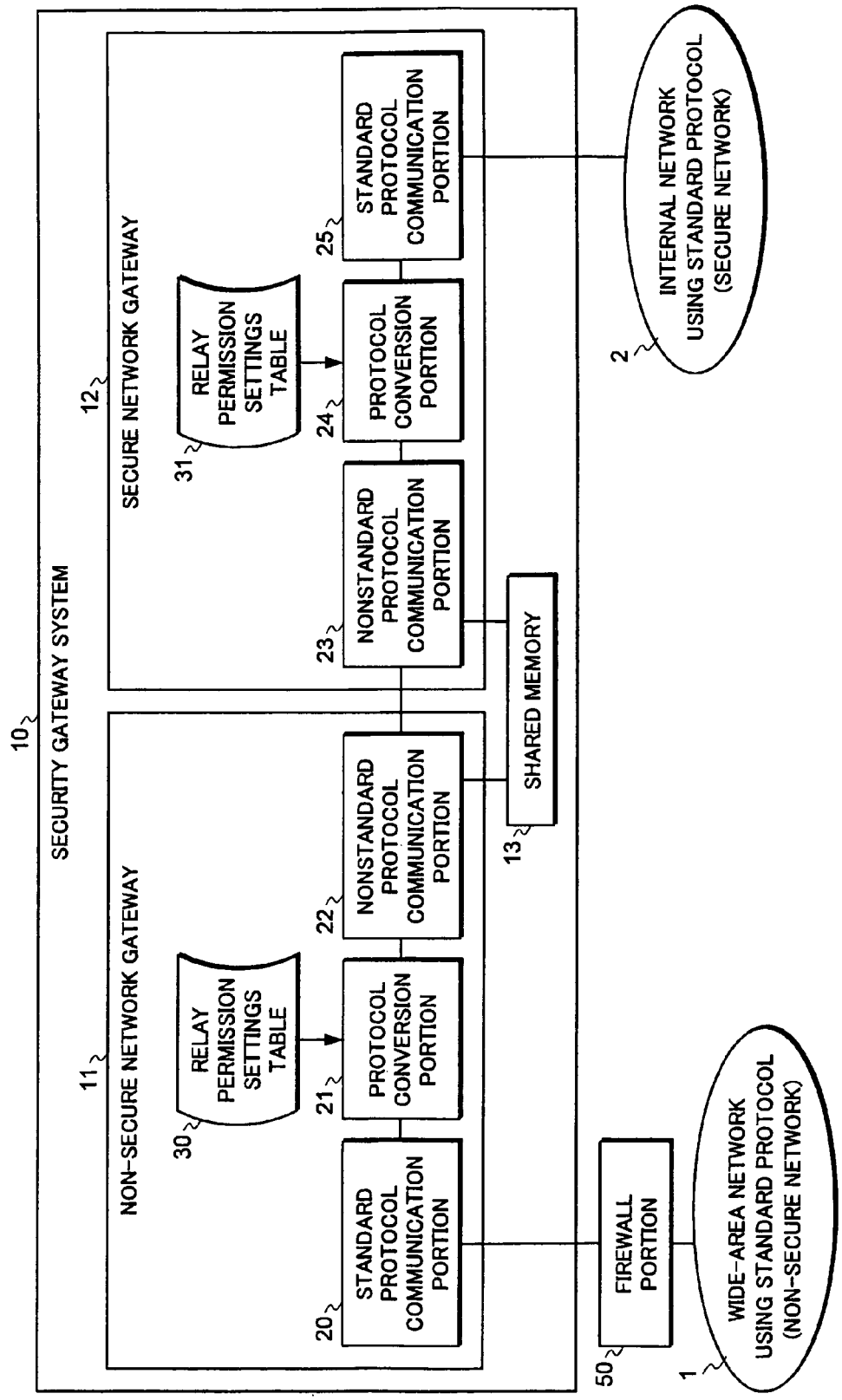
FIG. 21 shows the configuration of a modified example of the security gateway system of the sixth embodiment.

As a modified example of the sixth embodiment, FIG. 21 shows the configuration of a security gateway system combining an external firewall portion 50. In this modified example, it is clear that advantageous results similar to those of the sixth embodiment are obtained.

Other Embodiments

This invention is not limited to the above-described embodiments and modified examples, and various other modified examples can be carried out within the scope of the invention. For example, appropriate combinations of the above-described plurality of embodiments and modified examples are possible.

Further, the configuration and procedure of processing of the security gateway systems and sub-gateways comprised thereby are merely examples, and so long as two sub-gateways, realized by two mutually independent computers and connected to two networks, and which exchange data between the sub-gateways using a nonstandard protocol, and use only the application layer for data exchange between the nonstandard side and the standard side in the sub-gateways, the specific configuration and processing procedure can be freely modified.

Application Used as Basis for Priority Claim

This application is based on the prior Japanese Patent Application No. 2005-115024 (filed on Apr. 12, 2005), and claims the benefits of priority based on this prior Japanese patent application. The entire contents of this prior Japanese patent application are incorporated herein by reference.

The invention claimed is:

1. A security gateway system for connecting a plurality of networks each of which uses a standard protocol the standardized specifications of which have been published, the security gateway system comprising two sub-gateways realized by mutually independent and physically separated computers with one of the two sub-gateways connected to a wide-area network accessible to general public and the other of the two sub-gateways connected to an internal network necessary to be protected, and the two sub-gateways exchanging communication data with each other using a nonstandard protocol of which specifications have not been published, wherein each of said sub-gateways has a standard protocol communication portion which communicates with said network to which the same sub-gateway is connected using said standard protocol, a nonstandard protocol communication portion which communicates with the other sub-gateway using the nonstandard protocol, a protocol conversion portion which is provided between the standard protocol communication portion and the nonstandard protocol communication portion and performs protocol conversion of communication data between the standard protocol and the nonstandard protocol, and a relay permission setting information storage portion which is connected to the protocol conversion portion and stores relay permission setting information used to confirm relay permission for communication data;

said two sub-gateways have a shared memory which can be accessed by the respective nonstandard protocol communication portion of each of said sub-gateways, and are configured such that the communication data converted by the protocol conversion portion of one of the sub-gateways into a nonstandard protocol format and written in the shared memory by said nonstandard protocol communication portion of the one of the sub-gateways is detected by said nonstandard protocol communication portion of the other of the sub-gateways and passed to the protocol conversion portion of the other of the sub-gateways and converted into a standard protocol format;

said nonstandard protocol communication portion of each of said sub-gateways is an original communication portion which has an implemented application layer which is a seventh layer of the Open Systems Interconnection (OSI) model, and which has unpublished and original communication layers implemented for first through sixth layers of the OSI model, so that data exchange between the nonstandard protocol communication portion and said standard protocol communication portion within the same sub-gateway is performed only in the application layer which is the seventh layer, and data exchange between the nonstandard protocol communication portion and said standard protocol communication portion within the same sub-gateway is not possible using any published protocol of the first through sixth layers; and when performing protocol conversion of communication data, said protocol conversion portion of each of said sub-gateways refers to said relay permission setting information to confirm relay permission for the communication data, and performs protocol conversion of the communication data only when relay is permitted.

2. The security gateway system according to claim 1, wherein said standard protocol communication portion of each of said sub-gateways waits for reception of packet data from said network to which the same sub-gateway is connected, and each time packet data is received, passes the packet data to said protocol conversion portion of the same sub-gateway;

said nonstandard protocol communication portion of each of said sub-gateways waits for reception of packet data from the other sub-gateway, and each time packet data is received, passes the packet data to said protocol conversion portion of the same sub-gateway; and said protocol conversion portion of each of said sub-gateways, upon receiving packet data from either said standard protocol communication portion or from said nonstandard protocol communication portion in the same sub-gateway, confirms relay permission for the packet data by referring to said relay permission setting information, and if relaying of the packet data is not permitted, discards the packet data.

3. The security gateway system according to claim 1, wherein said relay permission information in each of said sub-gateways includes packet content inspection information for use in content propriety inspection of packet data, and said protocol conversion portion of each of said sub-gateways uses said packet content inspection information to perform content propriety inspection of packet data, and when the inspection result is unsatisfactory, discards the packet data.

4. The security gateway system according to claim 1, wherein, when said two sub-gateways are a non-secure network gateway and a secure network gateway, connected to a non-secure network to which numerous unspecified people are connected and to a secure network the security of which is required to be maintained, respectively, said non-secure network gateway has a notification portion which confirms relay permission for the communication data by referring to said relay permission setting information, and when there is no relay permission, notifies said secure network gateway of the occurrence of a security threat by means of said nonstandard protocol, and said secure network gateway has an alarm output portion which, upon receiving notification of the occurrence of said security threat from said non-secure network gateway, outputs an alarm indicating this occurrence of the security threat.

5. The security gateway system according to claim 4, wherein said alarm output portion of said secure network gateway uses said nonstandard protocol to transmit a stoppage instruction causing forcible stoppage of said non-secure network gateway at the time of output of an alarm, and said non-secure network gateway has a stoppage portion which forcibly stops the non-secure network gateway upon receiving said stoppage instruction signal from said secure network gateway.

6. The security gateway system according to claim 1, wherein, when said two sub-gateways are a non-secure network gateway and a secure network gateway, connected to a non-secure network to which numerous unspecified people are connected and to a secure network the security of which is required to be maintained, respectively, a firewall portion is further provided between said standard protocol communication portion of said non-secure network gateway and said non-secure network.

7. The security gateway system according to claim 1, wherein the standard protocol used in both the wide-area network accessible to general public and the internal network is the same.

8. A security gateway method for connecting a plurality of networks each of which uses a standard protocol the standardized specifications of which have been published, the method using, as two sub-gateways realized by mutually independent and physically separated computers with one of the two sub-gateways connected to a wide-area network accessible to general public and the other of the two sub-gateways connected to an internal network necessary to be protected, and the two sub-gateways exchanging communication data with each other using a nonstandard protocol of which specifications have not been published, two sub-gateways each having a standard protocol communication portion which uses said standard protocol to communicate with said network connected to the same sub-gateway, a nonstandard protocol communication portion which uses the nonstandard protocol to communicate with the other sub-gateway and has an implemented application layer which is a seventh layer of the Open Systems Interconnection (OSI) model, and unpublished and original communication layers implemented for first through sixth layers of the OSI model, a protocol conversion portion which is provided between the standard protocol communication portion and the nonstandard protocol communication portion and performs protocol conversion of communication data between the standard protocol and the nonstandard protocol, and a relay permission setting information storage portion which is connected to the protocol conversion portion and stores relay permission setting information used to confirm relay permission for communication data, and said two sub-gateways also using a shared memory which can be accessed by the respective nonstandard protocol communication portion of each of the sub-gateways, comprising the steps of:

performing gateway-to-gateway communication processing, in said nonstandard protocol communication portions of said two sub-gateways, such that the communication data converted by the protocol conversion portion of one of the sub-gateways into a nonstandard protocol fat mat and written in said shared memory by said nonstandard protocol communication portion of the one of the sub-gateways is detected by said nonstandard protocol communication portion of the other of sub-gateways and passed to said protocol conversion portion of the other of the sub-gateway and converted into a standard protocol format;

performing intra-gateway communication processing to exchange data between said nonstandard protocol communication portion and said standard protocol communication portion in each of said sub-gateways using only the seventh/application layer of the Open Systems Interconnection (OSI) model such that data exchange between said nonstandard protocol communication portion and said standard protocol communication portion within the same sub-gateway is not possible using any published protocol of the first through sixth layers of the OSI model; and performing relay permission confirmation and protocol conversion processing to, when performing protocol conversion of communication data in said protocol conversion portion of each of said sub-gateways, confirm relay permission for the communication data by referring to said relay permission setting information, and to perform protocol conversion of the communication data only when relaying is permitted.

9. The security gateway method according to claim 8, wherein the standard protocol used in both the wide-area network accessible to general public and the internal network is the same.

10. A non-transitory computer readable medium storing a security gateway program for realizing two sub-gateways respectively connected to two networks to be connected using mutually independent and physically separated computers, to connect a plurality of networks that are a wide-area network accessible to general public and an internal network necessary to be protected and uses a standard protocol the standardized specifications of which have been published, the two sub-gateways exchanging communication data with each other using a nonstandard protocol of which specifications have not been published, wherein when each of said sub-gateways has a standard protocol communication portion which uses said standard protocol to communicate with said network connected to the same sub-gateway, a nonstandard protocol communication portion which uses the nonstandard protocol to communicate with the other sub-gateway and has an implemented application layer which is a seventh layer of the Open Systems Interconnection (OSI) model, and unpublished and original communication layers implemented for first through sixth layers of the OSI model, a protocol conversion portion which is provided between the standard protocol communication portion and the nonstandard protocol communication portion and performs protocol conversion of communication data between the standard protocol and the nonstandard protocol, and a relay permission setting information storage portion which is connected to the protocol conversion portion and stores relay permission setting information used to confirm relay permission for communication data, and when said two sub-gateways also uses a shared memory which can be accessed by said nonstandard protocol communication portion of each of the sub-gateways, is further provided, said security gateway program causes said computers to execute:

a gateway-to-gateway communication function, in said nonstandard protocol communication portions of said two sub-gateways, such that the communication data converted by the protocol conversion portion of one of the sub-gateways into a nonstandard protocol format and written in said shared memory by said nonstandard protocol communication portion of the one of the sub-gateways is detected by said nonstandard protocol communication portion of the other of the sub-gateways and passed to said protocol conversion portion of the other of the sub-gateways and converted into a standard protocol format;

an intra-gateway communication function to exchange data between said nonstandard protocol communication portion and said standard protocol communication portion in each of said sub-gateways using only the seventh/application layer of the Open Systems Interconnection (OSI) model such that data exchange between said nonstandard protocol communication portion and said standard protocol communication portion within the same sub-gateway is not possible using any published protocol of the first through sixth layers; and a relay permission confirmation and protocol conversion function to, when performing protocol conversion of communication data in said protocol conversion portion of each of said sub-gateways, confirm relay permission for the communication data by referring to said relay permission setting information, and to perform protocol conversion of the communication data only when relaying is permitted.

11. The non-transitory computer readable medium according to claim 10, wherein the standard protocol used in both the wide-area network accessible to general public and the internal network is the same.

* * * * *